United States Patent
Song

(10) Patent No.: US 12,445,993 B2
(45) Date of Patent: Oct. 14, 2025

(54) METHOD AND APPARATUS FOR MANAGING MOBILITY IN COMMUNICATION SYSTEM

(71) Applicant: ELECTRONICS AND TELECOMMUNICATIONS RESEARCH INSTITUTE, Daejeon (KR)

(72) Inventor: Jae Su Song, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 395 days.

(21) Appl. No.: 18/126,110

(22) Filed: Mar. 24, 2023

(65) Prior Publication Data

US 2023/0309046 A1    Sep. 28, 2023

(30) Foreign Application Priority Data

Mar. 25, 2022   (KR) .................. 10-2022-0037201
Mar. 24, 2023   (KR) .................. 10-2023-0038697

(51) Int. Cl.
*H04W 60/04*    (2009.01)
*H04W 68/02*    (2009.01)
*H04W 76/30*    (2018.01)

(52) U.S. Cl.
CPC ........... *H04W 60/04* (2013.01); *H04W 68/02* (2013.01); *H04W 76/30* (2018.02)

(58) Field of Classification Search
CPC ..... H04W 60/04; H04W 76/30; H04W 68/02; H04W 8/26; H04W 8/08; H04W 60/00; H04W 12/75; H04W 76/11
See application file for complete search history.

(56) References Cited

U.S. PATENT DOCUMENTS

| | | | |
|---|---|---|---|
| 9,749,982 B2 | 8/2017 | Hahn et al. | |
| 9,930,634 B1 | 3/2018 | Sevindik | |
| 10,064,048 B1* | 8/2018 | Mui | H04W 8/26 |
| 10,231,089 B2* | 3/2019 | Ryu | H04W 8/005 |
| 10,312,991 B2 | 6/2019 | Wang et al. | |
| 11,483,736 B2* | 10/2022 | Gao | H04W 74/0833 |
| 2015/0237592 A1* | 8/2015 | Kim | H04W 72/23 |
| | | | 455/435.1 |

(Continued)

FOREIGN PATENT DOCUMENTS

WO    2019/160475 A1    8/2019

*Primary Examiner* — Chandrahas B Patel
(74) *Attorney, Agent, or Firm* — LRK PATENT LAW FIRM

(57) ABSTRACT

An operation method of a relay terminal may include: receiving, from a first base station to which the relay terminal is connected, a first area identifier for a first area corresponding to the first base station; generating a first virtual area identifier distinct from the first area identifier; transmitting the first virtual area identifier to a first remote terminal connected to the first base station through relaying of the relay terminal; performing a first area update procedure triggered by the first remote terminal based on the first virtual area identifier; and storing a first temporary identifier obtained based on the first area update procedure, wherein the first temporary identifier is used for a paging procedure for the first remote terminal.

20 Claims, 20 Drawing Sheets

(56) References Cited

U.S. PATENT DOCUMENTS

2018/0092017 A1   3/2018  Freda et al.
2021/0044956 A1   2/2021  Kim
2022/0022279 A1   1/2022  Kim

* cited by examiner

Scenario #1
relay UE: IC
remote UE: OOC

Scenario #2
relay UE: IC
remote UE: IC

Scenario #3
relay UE: first base station coverage
remote UE: second base station coverage Option #1: individual mobility management Option #2: group mobility management

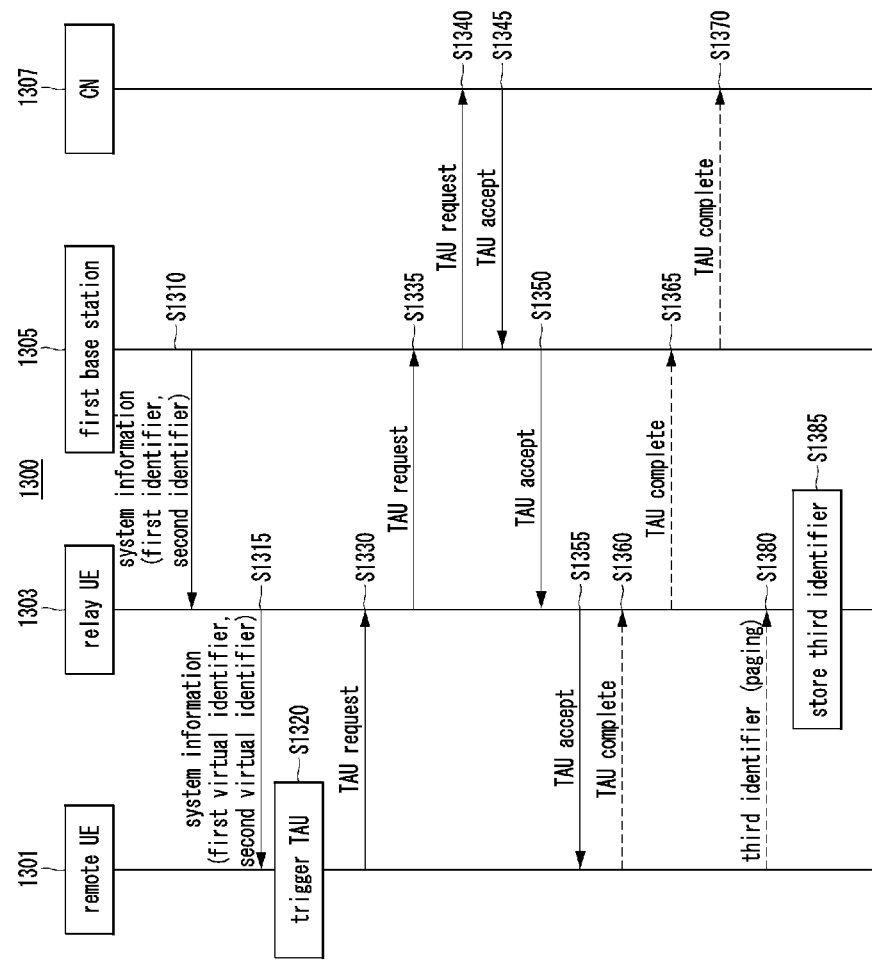

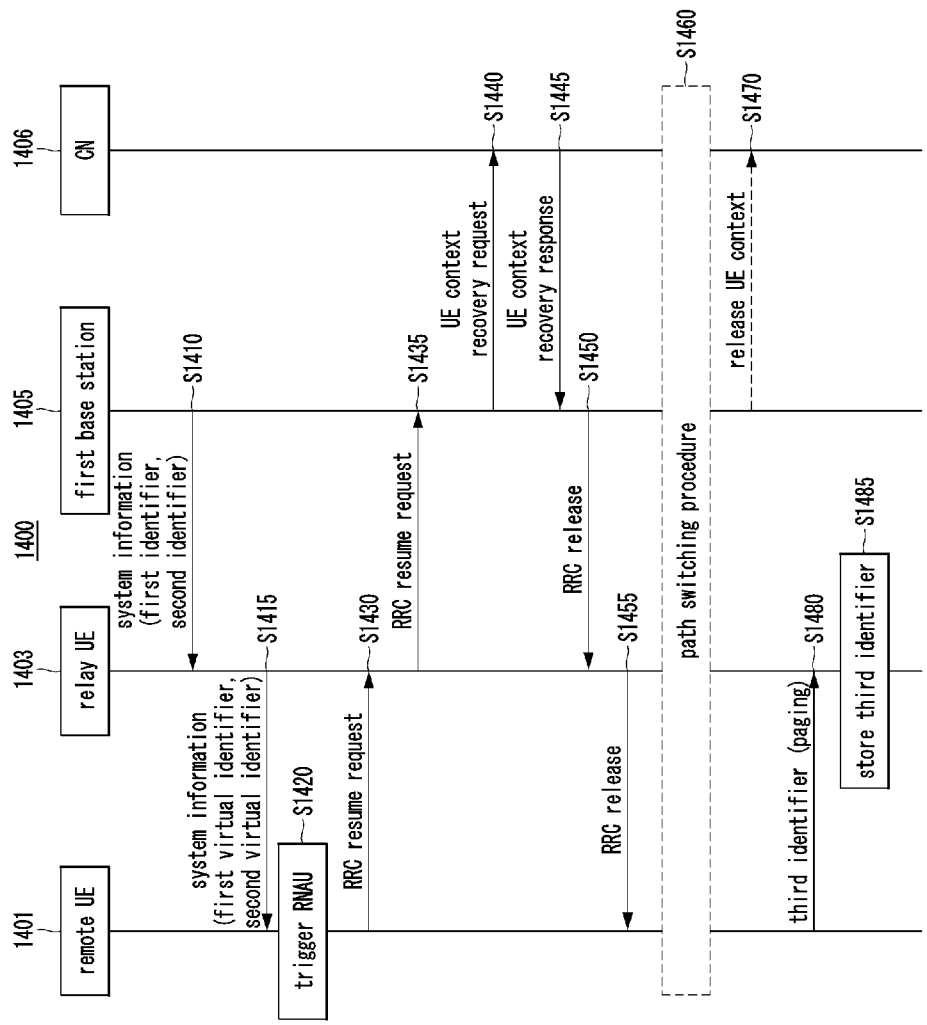

FIG. 18

| 8 | 7 | 6 | 5 | 4 | 3 | 2 | 1 | |
|---|---|---|---|---|---|---|---|---|
| mobile identity IE ||||||||  octet 1 |
| length of mobility identify contents |||||||| octet 2 |
| ^ |||||||| octet 3 |
| 1 | 1 | 1 | 1 | 0 spare | type of identity ||| octet 4 |
| AMF set ID |||||||| octet 5 |
| AMF set ID (cont.) || AMF pointer |||||| octet 6 |
| S-TMSI |||||||| octet 7 |
| S-TMSI(cont.) |||||||| octet 8 |
| S-TMSI(cont.) |||||||| octet 9 |
| S-TMSI(cont.) |||||||| octet 10 |

METHOD AND APPARATUS FOR MANAGING MOBILITY IN COMMUNICATION SYSTEM

CROSS-REFERENCE TO RELATED APPLICATIONS

This application claims priority to Korean Patent Applications No. 10-2022-0037201 filed on Mar. 25, 2022 and No. 10-2023-0038697 filed on Mar. 24, 2023 with the Korean Intellectual Property Office (KIPO), the entire contents of which are hereby incorporated by reference.

BACKGROUND

1. Technical Field

The present disclosure relates to a mobility management technique for a communication system, and more particularly, to a technique for improving efficiency of mobility management procedures in communications among a base station, relay terminal(s), and remote terminal(s).

2. Description of Related Art

With the development of information and communication technology, various wireless communication technologies are being developed. Representative wireless communication technologies include long term evolution (LTE) and new radio (NR) defined as the 3rd generation partnership project (3GPP) standards. The LTE may be one of 4th generation (4G) wireless communication technologies, and the NR may be one of 5th generation (5G) wireless communication technologies. A wireless communication technology after the 5G wireless communication technology (e.g., the sixth generation (6G) wireless communication technology, etc.) may be referred to as 'beyond-5G (B5G) wireless communication technology'.

In a radio communication environment, terminals adjacent to each other may perform sidelink communication based on a discovery procedure therebetween, a procedure of configuring a sidelink therebetween, and a procedure of transmitting resource information and data by utilizing sidelink resources through the sidelink. The terminals adjacent to each other may perform direct communication through the sidelink, and sidelink control and configuration procedures may be performed by a function included in a communication network such as a sidelink server. Based thereon, some of mutually adjacent terminals may operate as relay terminal(s), and other terminals may operate as remote terminals connected to a base station through the relay terminal(s).

In an exemplary embodiment of a communication system, mobility of one or more remote terminals connected to a base station through a relay terminal may depend on mobility of the relay terminal. For example, when a procedure for mobility management for the relay terminal, such as handover, is performed as the relay terminal moves, corresponding signaling operations for mobility management may also be required for each of one or more remote terminals. When such signaling operations for mobility management of the relay terminal and one or more remote terminals are performed almost simultaneously, a large load may be generated in the network. Accordingly, a technique for improving efficiency of the mobility management procedures for the relay terminal and one or more remote terminals may be required.

Matters described as the prior arts are prepared to promote understanding of the background of the present disclosure, and may include matters that are not already known to those of ordinary skill in the technology domain to which exemplary embodiments of the present disclosure belong.

SUMMARY

In order to solve the above-identified problems, exemplary embodiments of the present disclosure are directed to providing a mobility management method and apparatus for improving efficiency of mobility management procedures for a relay terminal and one or more remote terminals.

According to an exemplary embodiment of the present disclosure for achieving the above-described objective, an operation method of a relay terminal may comprise: receiving, from a first base station to which the relay terminal is connected, a first area identifier for a first area corresponding to the first base station; generating a first virtual area identifier distinct from the first area identifier; transmitting the first virtual area identifier to a first remote terminal connected to the first base station through relaying of the relay terminal; performing a first area update procedure triggered by the first remote terminal based on the first virtual area identifier; and storing a first temporary identifier obtained based on the first area update procedure, wherein the first temporary identifier is used for a paging procedure for the first remote terminal.

The performing of the first area update procedure may comprise: receiving, from the first remote terminal, a first request message for the first area update procedure; transmitting, to the first base station, a second request message based on the received first request message; receiving, from the first base station, a first response message as a response to the second request message; transmitting, to the first remote terminal, a second response message based on the first response message; and receiving, from the first remote terminal, the first temporary identifier obtained by the first remote terminal based on the second response message.

The second request message may include a plurality of temporary identifiers respectively preconfigured for a plurality of remote terminals connected to the first base station through relaying of the relay terminal, and the plurality of remote terminals may include the first remote terminal.

The operation method may further comprise: moving to a second base station belonging to a second area different from the first area, after storing the first temporary identifier; receiving, from the second base station, a second area identifier for the second area; transmitting, to the first remote terminal, the first virtual area identifier; performing a second area update procedure triggered by the relay terminal based on the received second area identifier; and storing a second temporary identifier obtained by the relay terminal based on the second area update procedure, wherein the second temporary identifier is an identifier newly assigned for the paging procedure for the first remote terminal.

The performing of the second area update procedure may comprise: determining whether the second area update procedure is required based on the second area identifier; generating a second request message when the second area update procedure is determined to be required; transmitting the generated second request message to the first base station; receiving, from the first base station, a first response message as a response to the second request message; and obtaining the second temporary identifier included in the first response message.

The operation method may further comprise: performing a third area update procedure triggered by the first remote terminal based on a first cycle timer, after storing the first temporary identifier; and storing a third temporary identifier received from the first remote terminal based on the third area update procedure, wherein the third temporary identifier is an identifier newly assigned for the paging procedure for the first remote terminal.

The operation method may further comprise: after storing the first temporary identifier, deleting the stored first temporary identifier based on a second cycle timer.

The operation method may further comprise: receiving a radio resource control (RRC) release message for a second remote terminal in an RRC-connected state, which is connected the first base station through relaying of the relay terminal; transmitting the received RRC release message to the second remote terminal; receiving, from the second remote terminal, a fourth temporary identifier obtained by the second remote terminal based on the RRC release message; and storing the fourth temporary identifier, wherein the fourth temporary identifier is used for the paging procedure for the second remote terminal.

Each of the first and second areas may be a tracking area (TA), each of the first and second area identifiers may be a TA identifier (TAI), the first virtual area identifier may be a virtual-TAI (V-TAI), and each of the first and second area update procedures may be a TA update (TAU) procedure.

Each of the first and second areas may be a radio access network (RAN) notification area (RNA), each of the first and second area identifiers may be a RAN area identifier (RAI), the first virtual area identifier may be a virtual-RAI (V-RAI), and each of the first and second area update procedures may be an RNA update (RNAU) procedure.

According to another exemplary embodiment of the present disclosure for achieving the above-described objective, an operation method of a first base station may comprise: transmitting, to a first relay terminal connected to the first base station, a first area identifier for a first area corresponding to the first base station; and transmitting a first temporary identifier to the first relay terminal based on a first area update procedure triggered by a first remote terminal connected to the first base station through relaying of the first relay terminal, wherein the first area update procedure is triggered by the first remote terminal when the first remote terminal receives a first virtual area identifier distinct from the first area identifier, which is generated by the first relay terminal, and the first temporary identifier is used for a paging procedure for the first remote terminal.

The transmitting of the first temporary identifier may comprise: receiving a second request message transmitted by the first relay terminal based on a first request message for the first area update procedure, the first request message being received by the first relay terminal from the first remote terminal; and transmitting a first response message including the first temporary identifier in response to the second request message.

The second request message may include a plurality of temporary identifiers respectively preconfigured for a plurality of remote terminals connected to the first base station through relaying of the first relay terminal, and the plurality of remote terminals may include the first remote terminal.

Each of the first and second areas may be a tracking area (TA), each of the first and second area identifiers may be a TA identifier (TAI), the first virtual area identifier may be a virtual-TAI (V-TAI), each of the first and second area update procedures may be a TA update (TAU) procedure, and the transmitting of the first response message may comprise: transmitting, to a core network to which the first base station is connected, a third request message based on the second request message; receiving, from the core network, a second response message including the first temporary identifier configured for the first remote terminal as a response to the third request message; and transmitting, to the first remote terminal, the first response message including the first temporary identifier included in the second response message.

Each of the first and second areas may be a radio access network (RAN) notification area (RNA), each of the first and second area identifiers may be a RAN area identifier (RAI), the first virtual area identifier may be a virtual-RAI (V-RAI), each of the first and second area update procedures may be an RNA update (RNAU) procedure, and the transmitting of the first response message may comprise: configuring the first temporary identifier for the first remote terminal based on the second request message; and transmitting, to the first remote terminal, the first response message including the first temporary identifier configured for the first remote terminal.

The operation method may further comprise: after transmitting the first temporary identifier, transmitting a second temporary identifier to the first relay terminal based on a second area update procedure triggered by the first remote terminal based on a first cycle timer, wherein the second temporary identifier may be an identifier newly assigned for the paging procedure for the first remote terminal.

According to yet another exemplary embodiment of the present disclosure for achieving the above-described objective, a relay terminal may comprise a processor, and the processor may cause the relay terminal to perform: receiving, from a first base station to which the relay terminal is connected, a first area identifier for a first area corresponding to the first base station; generating a first virtual area identifier distinct from the first area identifier; transmitting the first virtual area identifier to a first remote terminal connected to the first base station through relaying of the relay terminal; performing a first area update procedure triggered by the first remote terminal based on the first virtual area identifier; and storing a first temporary identifier obtained based on the first area update procedure, wherein the first temporary identifier is used for a paging procedure for the first remote terminal.

In the performing of the first area update procedure, the processor may further cause the relay terminal to perform: receiving, from the first remote terminal, a first request message for the first area update procedure; transmitting, to the first base station, a second request message based on the received first request message; receiving, from the first base station, a first response message as a response to the second request message; transmitting, to the first remote terminal, a second response message based on the first response message; and receiving, from the first remote terminal, the first temporary identifier obtained by the first remote terminal based on the second response message.

The processor may further cause the relay terminal to perform: moving to a second base station belonging to a second area different from the first area, after storing the first temporary identifier; receiving, from the second base station, a second area identifier for the second area; transmitting, to the first remote terminal, the first virtual area identifier; performing a second area update procedure triggered by the relay terminal based on the received second area identifier; and storing a second temporary identifier obtained by the relay terminal based on the second area update procedure, wherein the second temporary identifier is an identifier newly assigned for the paging procedure for the first remote terminal.

The processor may further cause the relay terminal to perform: performing a third area update procedure triggered by the first remote terminal based on a first cycle timer, after storing the first temporary identifier; and storing a third temporary identifier received from the first remote terminal based on the third area update procedure, wherein the third temporary identifier is an identifier newly assigned for the paging procedure for the first remote terminal.

According to exemplary embodiments of a mobility management method and apparatus in a communication system, mobility management procedures for one or more remote terminals connected to a base station through a relay terminal may be performed on a group basis. At least part of the mobility management procedures for the one or more remote terminals may be performed by the relay terminal rather than each of the one or more remote terminals. The relay terminal may transmit a separately configured virtual area identifier to the remote terminal instead of an area identifier (e.g., tracking area identifier (TAI) or radio access network (RAN) area identifier (RAI)) received from the base station. Accordingly, an update procedure for a TA or RNA can be performed by the relay terminal rather than the one or more remote terminals. According to the mobility management method, the amount of load generated in the network for mobility management can be reduced.

BRIEF DESCRIPTION OF DRAWINGS

FIG. 13 is a sequence chart for describing an exemplary embodiment of a mobility management procedure for a remote terminal in an idle state in a communication system.

FIG. 14 is a sequence chart for describing an exemplary embodiment of a mobility management procedure for a remote terminal in an inactive state in a communication system.

FIG. 18 is a conceptual diagram for describing a first exemplary embodiment of a mobile identity (IE) information element in a communication system.

DETAILED DESCRIPTION OF THE EMBODIMENTS

Figure 1:
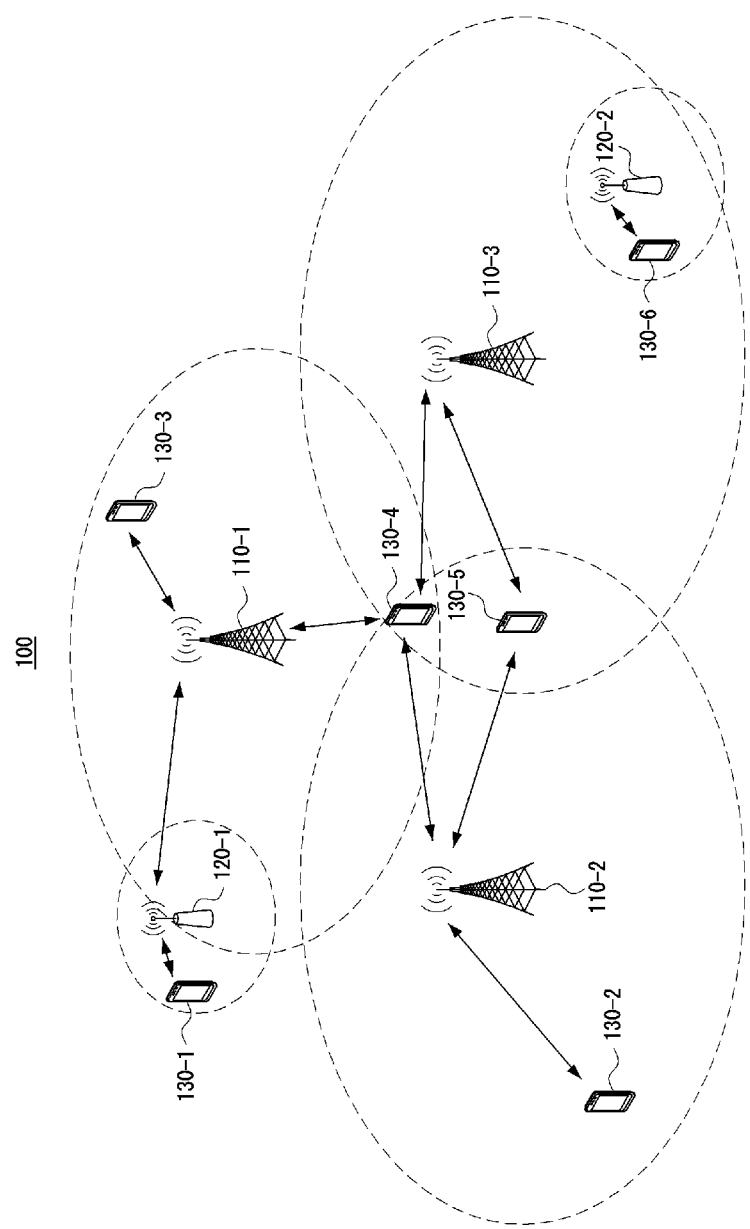
FIG. 1 is a conceptual diagram illustrating an exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSDPA), 4G mobile communication network such as a long term evolution (LTE) network or an LTE-Advanced network, 5G mobile communication network, B5G mobile communication network (6G mobile communication network), or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present disclosure, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
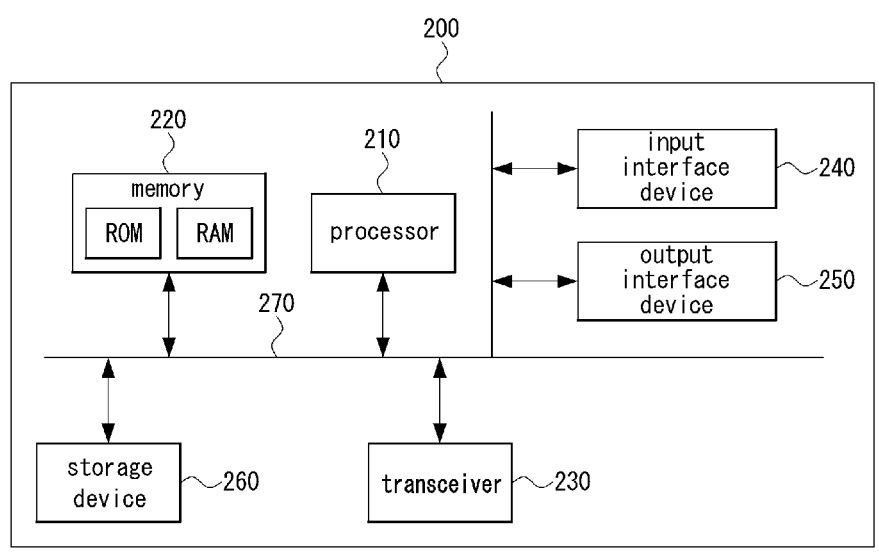
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, mobility management methods in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a receiving node is described, a corresponding transmitting node may perform an operation corresponding to the operation of the receiving node. Conversely, when an operation of a transmitting node is described, a corresponding receiving node may perform an operation corresponding to the operation of the transmitting node.

Figure 3:
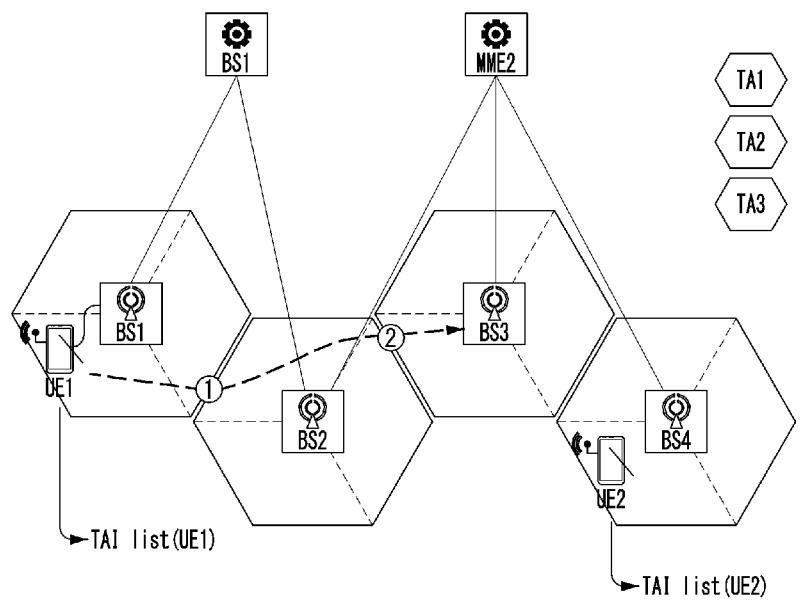
FIG. 3 is a conceptual diagram for describing an exemplary embodiment of a tracking area (TA)-based mobility management scheme in a communication system.

FIG. 3 is a conceptual diagram for describing an exemplary embodiment of a tracking area (TA)-based mobility management scheme in a communication system.

Referring to FIG. 3, a communication system 300 may include a plurality of communication nodes. For example, the communication system 300 may include one or more base stations (BSs) and one or more UEs (or terminals). Hereinafter, an exemplary embodiment of the TA-based mobility management method in the communication system will be described by taking a situation in which a plurality of BSs exist in the communication system 300 as an example. However, this is only an example for convenience of description, and the exemplary embodiment of the TA-based mobility management method in the communication system is not limited thereto.

The communication system 300 may include a core network, a plurality of BSs (e.g., BS1, BS2, BS3, BS4, etc.), and one or more UEs (e.g., UE1, UE2, etc.). The core network may include one or more MMES (e.g., MME1, MME2, etc.). The one or more MMES may be the same as or similar to the MME described with reference to FIG. 1. Each of the plurality of BSs may be the same as or similar to the base stations 110-1, 110-2, 110-3, 120-1, and 120-2 described with reference to FIG. 1. The one or more UEs (e.g., UE1 and UE2) may be the same as or similar to the terminals 130-1, 130-2, 130-3, 130-4, 130-5, and 130-6 described with reference to FIG. 1. The plurality of BSs may be connected to the core network through the one or more MMES. The one or more UEs may be connected to the core network by being connecting to one or more BSs among the plurality of BSs.

When one or more UEs are in an idle state, the network may determine a location of each UE in a TA unit instead of a cell unit. For example, the idle state may mean an Evolved Packet System (EPS) Mobility Management-Registered (EMM-Registered) state supported by an EPS EMM. The idle state may mean an EPS Connection Management (CM)-idle (ECM-Idle) state supported by an EPS ECM. The idle state may mean a Radio Resource Control (RRC) idle (RRC-IDLE) state supported by an RRC function (or RRC layer).

A communication service provider may define one TA by grouping one or more BSs (e.g., eNBs or gNBs, etc.). For example, a BS1 may correspond to a TA1, a BS2 may correspond to a TA2, and a BS3 and a BS4 may correspond to a TA3. Such the mapping relationship between BSs and TAs may be determined in a network design process. In other words, which TA each of the BSs belongs to may be determined in advance.

When a UE is in the idle state and traffic directed to the UE occurs, the network may perform paging for the UE. In other words, the network may transmit a paging message (or paging signal) to the UE so that the UE transitions to an active state and receives the traffic.

For example, when traffic toward the UE2 located within a coverage of the BS4 belonging to the TA3 occurs, the network may transmit a paging message to all BSs (BS3 and BS4) belonging to the TA3. The BS3 and BS4 may respectively transmit paging messages to one or more UEs within their coverages. UEs within the TA3 (i.e., within the coverage of BS3 and the coverage of BS4) may receive the paging messages transmitted by the network. Accordingly, the UE2 within the coverage of BS4 may receive the paging message transmitted from the network and transition to the active state based on the paging message. In this manner, the UE2 within the coverage of BS4 belonging to the TA3 may transition to the active state by receiving the paging message transmitted by the network based on the TA, and receive traffic in the active state.

For the TA-based mobility management, a TA identifier (TAI) may be defined. The TAIs may be used for classification and/or identification of the TAs. Each UE may obtain information on the TAIs through signaling from the base station or network. For example, each UE may obtain a list of TAIs (i.e., TAI list) through system information (e.g., system information block (SIB), etc.) received when accessing the network. The TAI list may be defined identically or differently for each of the UEs. For example, a TAI list provided to the UE1 and a TAI list provided to the UE2 may be identical to or different from each other. The TAI will be described in more detail with reference to FIG. 4 below.

Figure 4:
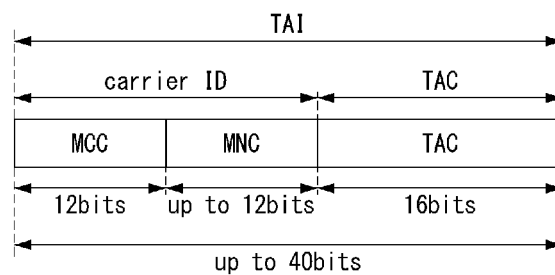
FIG. 4 is a conceptual diagram for describing an exemplary embodiment of a TAI format in a communication system.

FIG. 4 is a conceptual diagram for describing an exemplary embodiment of a TAI format in a communication system.

Referring to FIG. 4, a communication system may support TA-based mobility management. For the TA-based mobility management, a TAI for identification of each TA may be defined. Hereinafter, in describing an exemplary embodiment of the TAI format in the communication system with reference to FIG. 4, descriptions overlapping those described with reference to FIGS. 1 to 3 may be omitted.

The TAI may be defined to include information on the TA and/or information on a communication service provider. For example, the TAI may include a TA code (TAC). The TAC may be an identifier defined for geographical classification of the TA. The TAC may be determined by each communication service provider (or carrier) and assigned to each TA.

Meanwhile, the TAI may include information of a carrier identifier (ID). Here, the carrier ID may be a Public Land Mobile Network (PLMN) ID. The PLMN ID may be a unique identification number assigned to each carrier network. The carrier ID may be configured based on a mobile country code (MCC) and a mobile network code (MNC). Here, the MCC may be a code for identifying a communication country, region, and the like. The MNC may be a code for identifying a specific network or carrier within the same MCC.

In an exemplary embodiment of a TAI format, the size of the TAC may be 16 bits. The size of MCC may be 12 bits. The size of MNC may be up to 12 bits. Accordingly, the size of the TAI may be up to 40 bits. However, this is only an example for convenience of description, and the exemplary embodiment of the TAI in the communication system is not limited thereto.

Referring again to FIG. 3, the network may provide a TAI list for each of the UE1 within the coverage of BS1 belonging to the TA1 and the UE2 within the coverage of BS4 belonging to the TA3. The UE1 and UE2 each may obtain the TAI list provided from the network.

The TAI list provided to the UE1 may include information on a TAI corresponding to the TA1 and information on a TAI corresponding to the TA2 adjacent to the TA1. The TAI list provided to the UE2 may include information on a TAI corresponding to the TA3 and information on the TAI corresponding to the TA2 adjacent to the TA3. For example, the UE1 may obtain the TAI list expressed as {TAI1, TAI2} or {TAC1, TAC2}. The UE2 may obtain the TAI list expressed as {TAI2, TAI3} or {TAC2, TAC3}. Here, the TAD and TAC1 may correspond to the TA1. The TAI2 and TAC2 may correspond to the TA2. The TAI3 and TAC3 may correspond to the TA3.

Due to movement of the UEs or changes in a communication environment, a procedure for updating the TA information or TA list may be required. Such an update procedure may be referred to as 'TA update (TAU)' or 'TAU procedure'. For example, when the UE1 passes a point ① and moves to the coverage of BS2, it may be regarded as leaving the TA1 and entering the TA2. In this case, since the TAI list of the UE1 includes information corresponding to the TA2 (e.g., TAI2, TAC2, etc.), a separate TAU procedure may not be required. On the other hand, when the UE1 passes a point ② and moves to the coverage of BS3, it may be regarded as leaving the TA2 and entering the TA3. In this case, since the TAI list of the UE1 does not include information corresponding to the TA3 (e.g., TAI3, TAC3, etc.), a TAU procedure for the UE1 may be required. The TAU procedure will be described in more detail with reference to FIG. 5 below.

Figure 5:
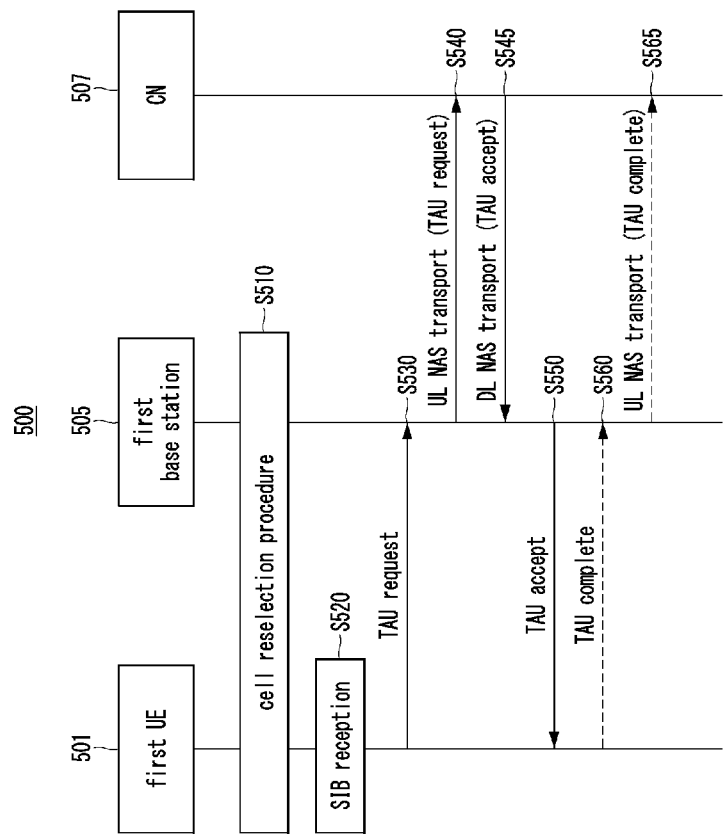
FIG. 5 is a sequence chart for describing an exemplary embodiment of a TAU procedure in a communication system.

FIG. 5 is a sequence chart for describing an exemplary embodiment of a TAU procedure in a communication system.

Referring to FIG. 5, a communication system 500 may include a core network (CN), one or more base stations, and one or more UEs. The one or more base stations may be the same as or similar to the BSs (BS1, BS2, BS3, BS4, etc.) described with reference to FIG. 3. The one or more UEs may be the same as or similar to the UEs (UE1, UE2, etc.) described with reference to FIG. 3. Hereinafter, in describing the exemplary embodiment of the TAU procedure in the communication system with reference to FIG. 5, descriptions overlapping those described with reference to FIGS. 1 to 4 may be omitted.

The communication system 500 may include a first UE 501, a first base station 505, a CN 507, and the like. Here, the CN 507 may refer to the entire CN. The CN 507 may refer to some of functions or nodes of the CN. For example, the CN 507 may refer to an MME or AMF of the CN. Here, the MME may be the same as or similar to the MME described with reference to FIGS. 1 and 3. The AMF may be the same as or similar to the AMF described with reference to FIG. 1. The first UE 501 may be in the idle state.

In an exemplary embodiment of the communication system 500, a cell reselection procedure for the first UE 501 may be performed (S510). In the cell reselection procedure S510, the first UE 501 may move from one cell (or base station) to another cell (or base station). For example, the first UE 501 may move to a cell of the first base station 505. The first UE 501 may receive system information from the new cell (i.e., the cell of the first base station 505) (S520). The system information received by the first UE 501 in step S520 may be, for example, system information block(s) (SIB(s)).

The first UE 501 may identify whether a TA to which it belongs has changed based on the system information received in step S520. In other words, the first UE 501 may identify whether it has moved from the existing TA to a new TA as it performs the cell reselection. To this end, the system information transmitted and received in step S520 may include information on which TA the first base station belongs to.

The first UE 501 may trigger a TAU procedure when it is determined that it has entered a new TA (hereinafter referred to as 'first TA') as it moves to the cell of the first base station 505. On the other hand, when it is determined that the first UE 501 has moved to the cell of the first base station 505 but has not left the existing TA, the first UE 501 may not trigger a TAU procedure. Alternatively, even when the first UE 501 determines that it has moved from the previous TA (hereinafter referred to as 'second TA') to the first TA, if a previously obtained TAI list includes information on a TAI corresponding to the first TA, the first UE 501 may not trigger a TAU procedure. On the other hand, the first UE 501 may trigger a TAU procedure based on a predetermined separate criterion. For example, the first UE 501 may repeatedly trigger a TAU procedure based on a periodicity or timer preconfigured by the CN 507.

The first UE 501 may transmit a TAU request message to the first base station 505 (S530). The first base station 505 may receive the TAU request message transmitted from the first UE 501 (S530). The TAU request message transmitted in step S530 may include information on which TA the first UE 501 previously belonged to. For example, the TAU request message may include information on a TAI for the second TA (hereinafter referred to as second TAI').

The first UE 501 may transmit, to the first base station 505, information on a temporary identifier previously assigned to the first UE 501. Here, the temporary identifier may correspond to a Globally Unique Temporary Identifier (GUTI), Temporary Mobile Subscription Identifier (TMSI), Shortened TMSI (S-TMSI), and/or the like. The S-TMSI may be a 5G-S-TMSI according to 5G communication. In step S530, the information on the temporary identifier previously assigned to the first UE 501 (hereinafter referred to as 'first temporary identifier') may be transmitted together with the TAU request message. Alternatively, the information on the first temporary identifier may be transmitted as being included in the TAU request message.

The first base station 505 may transmit a signal including at least a part of the message and/or information received in step S530 to the CN 507 (S540). The CN 507 may receive the signal transmitted from the first base station 505 (S540). For example, in step S540, the first base station 505 may transmit the TAU request message received in step S530 and/or information on the first temporary identifier to the CN 507 through an uplink (UL). In step S540, the first base station 505 may generate a 'UL non-access stratum (NAS) message', which is a NAS message, and transmit the generated UL NAS message to the CN 507. Here, the UL NAS message may be generated to include at least a part of the message and/or information received in step S530. The signal transmitted from the first base station 505 to the CN 507 in step S540 may include identification information about the TA (hereinafter referred to as 'first TA') to which the first base station 505 belongs. For example, the UL NAS message generated and transmitted in step S530 may include information on the TAI (hereinafter referred to as 'first TAI') for the first TA.

The CN 507 may determine whether to reassign a TA to the first UE 501 based on the signal received in step S540. For example, the CN 507 may identify information on the first TAI and information on the second TAI included in the signal received in step S540. The CN 507 may identify that the first UE 501 previously belonged to the second TA based on the information of the second TAI included in the TAU request message. In this case, the second TAI may be expressed as 'last visited TAI'. Alternatively, the CN 507 may identify that the first UE 501 previously belonged to the second TA by checking TA assignment information previously configured for the first UE. Meanwhile, the CN 507 may identify that the first UE 501 is currently located in the first TA based on the information of the first TAI included in the UL NAS message.

When the first TA (or first TAI) and the second TA (or second TAI) do not match, the CN 507 may perform TA reassignment for the first UE 501. Here, the CN 507 may perform TA reassignment for the first UE 501 based on location and/or speed information of the first UE 501. For example, a TA having a wider area than a TA allocated to a UE having a relatively slow movement speed may be allocated to a UE having a relatively fast movement speed in order to reduce a load due to TAU signaling. The CN 507 may update the TA list based on the TA reassignment. In other words, the CN 507 may generate an updated TA list based on the TA reassignment. Meanwhile, the CN 507 may generate a temporary identifier (hereinafter referred to as 'second temporary identifier') to be newly assigned to the first UE 501 based on the TA reassignment.

The CN 507 may transmit a signal including a TAU accept message, which is a response to the TAU request message received in step S540, to the first base station 505 (S545). The first base station 505 may receive the signal transmitted from the CN 507 (S545). For example, in step S545, the CN 507 may generate the TAU accept message to be transmitted to the first UE 501, and transmit the signal including the generated TAU accept message to the first base station 505 through a downlink (DL). In step S545, the CN 507 may generate a 'DL NAS message', which is a NAS message, and transmit the generated DL NAS message to the CN 507. Here, the DL NAS message may be generated to include the TAU accept message. The TAU accept message may be generated to include information of the TA list updated based on the TA reassignment performed by the CN 507 and/or information of the second temporary identifier.

The first base station 505 may transmit a signal including at least a part of the message and/or information included in the signal received in step S545 to the first UE 501 (S550). The first UE 501 may receive the signal transmitted from the first base station 505 (S550). The signal transmitted in step S550 may include the TAU accept message transmitted from the CN 505. The signal transmitted in step S550 may include information of the updated TA list and/or information of the second temporary identifier.

The first UE 501 may transmit, to the first base station 505, a TAU complete message indicating that the TAU accept message (or at least a part of the information included in the TAU accept message) transmitted from the CN 507 has been received (S560). The first base station 505 may receive the TAU complete message from the first UE 501 (S560). The first base station 505 may transmit a signal including the TAU complete message received in step S560 to the CN 507 (S565). The CN 507 may receive the signal transmitted from the first base station 505 (S565). In step S565, the TAU complete message may be transmitted to the CN 507 as being included in a UL NAS transport message. The signaling operations of the TAU complete message according to steps S560 and S565 may be omitted.

Figure 6:
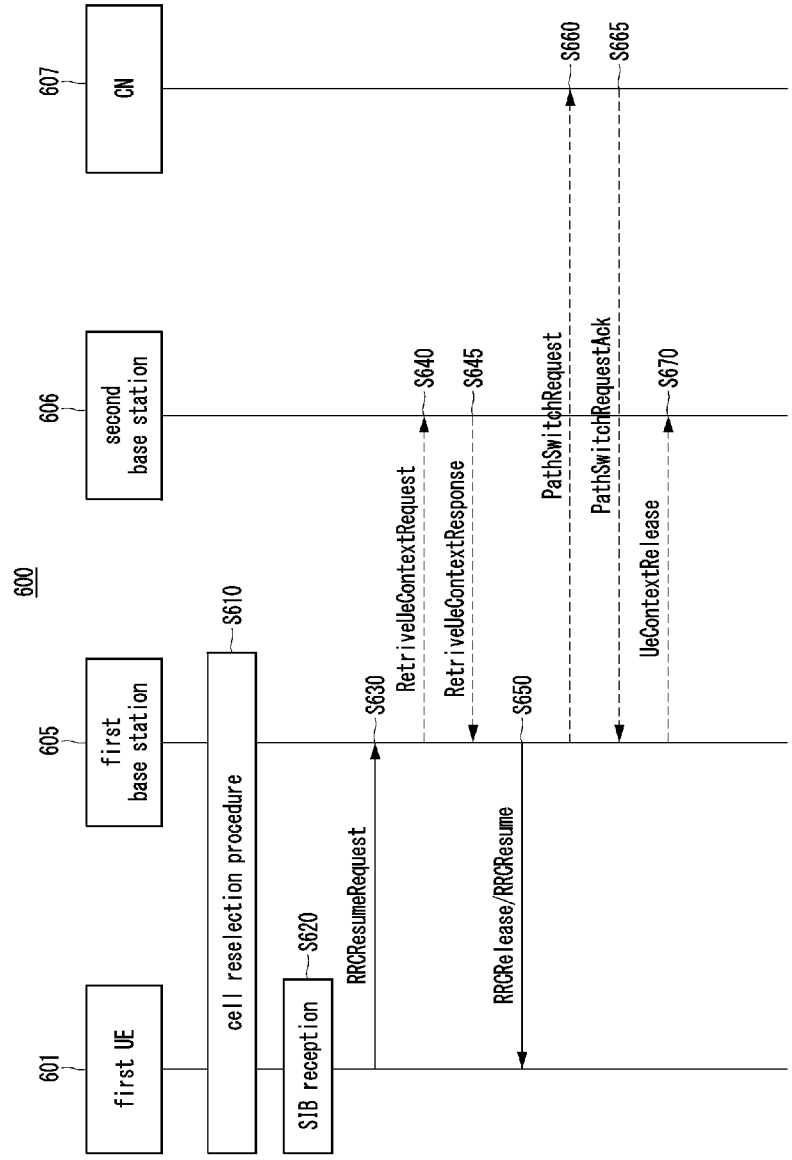
FIG. 6 is a sequence chart for describing an exemplary embodiment of a Radio Access Network (RAN) Notification Area (RNA) update (RNAU) procedure in a communication system.

FIG. 6 is a sequence chart for describing an exemplary embodiment of a Radio Access Network (RAN) Notification Area (RNA) update (RNAU) procedure in a communication system.

Referring to FIG. 6, a communication system 600 may include a core network (CN), one or more base stations, and one or more UEs. The one or more base stations may be the same as or similar to the BSs (BS1, BS2, BS3, BS4, etc.) described with reference to FIG. 3. The one or more UEs may be the same as or similar to the UEs (UE1, UE2, etc.) described with reference to FIG. 3. Hereinafter, in describing the exemplary embodiment of the RNAU procedure in the communication system with reference to FIG. 6, descriptions overlapping those described with reference to FIGS. 1 to 5 may be omitted.

The communication system 600 may include a first UE 601, a first base station 605, a second base station 606, a CN 607, and the like. The first base station 605 may refer to a base station to which the first UE 601 is connected based on a cell reselection procedure. The second base station 606 may refer to a base station to which the first UE 601 was connected before the cell reselection procedure. The first UE 501 may be in an inactive state. Here, the inactive state may mean an RRC_INACTIVE state supported by the RRC function (or RRC layer).

The inactive state may be used to facilitate transition to a connected state. Here, the connected state may mean an RRC CONNECTED state supported by the RRC function (or RRC layer). In an exemplary embodiment of the communication system 600, when the first UE 601 is in the inactive state, a UE context for the first UE 601 may exist in the RRC layer. The first UE 601 may easily transition from the inactive state to the connected state based on the UE context existing in the RRC layer.

Mobility management in the inactive state may be performed in unit of a RAN Notification Area (RNA) managed by a RAN. This may be partly similar to that mobility management in the idle state is performed in a unit of TA. For mobility management based on an RNA managed by the RAN, a RAN Area Identifier (RAI) may be defined. The RAI may be used for classification and/or identification of the RNA. Each UE may obtain information on RAI(s) through signaling from the base station or network. For example, system information (e.g., SIB, etc.) broadcast to the entire cell from the RRC of the base station may include information on RAIs. Each UE may obtain information on the RAIs included in the system information by receiving the system information. Due to movement of UEs or changes in the communication environment, a procedure for updating information on the RNAs may be required. Such an update procedure may be referred to as 'RNA update (RNAU)' or 'RNAU procedure'.

In an exemplary embodiment of the communication system 600, a cell reselection procedure for the first UE 601 may be performed (S610). In the cell reselection procedure (S610), the first UE 601 may move from the cell of the second base station 606 to the cell of the first base station 605. The first UE 601 may receive system information from the new cell (i.e., the cell of the first base station 605) (S620). The system information received by the first UE 601 in step S620 may be, for example, SIB(s).

Based on the system information received in step S620, the first UE 601 may identify whether the RNA (i.e., RNA) to which it belongs has been changed. In other words, as the first UE 601 performs cell reselection, it may identify whether it has moved from the existing RNA to the new RNA. To this end, the system information transmitted and received in step S620 may include information on which RNA the first base station belongs to.

When the first UE 601 determines that it has entered the new RNA (hereinafter referred to as 'first RNA') as it moves to the cell of the first base station 605, it may trigger an RNAU procedure. On the other hand, when it is determined that the first UE 601 moves to the cell of the first base station 605 but does not deviate from the existing RNA, it may not trigger an RNAU procedure. On the other hand, the first UE 601 may trigger an RNAU procedure based on a predetermined separate criterion. For example, the first UE 601 may repeatedly trigger an RNAU procedure based on a periodicity or timer preconfigured by the CN 607.

Triggering the RNAU procedure, the first UE 601 may transmit an RRC resume request message to the first base station 605 (S630). The first base station 605 may receive the RRC resume request message transmitted from the first UE 601 (S630). The RRC resume request message transmitted in step S630 may be an RRCResumeRequest message. In an exemplary embodiment of the communication system 600, the RRC resume request message may be defined to include the same or similar information as shown in Table 1.

TABLE 1

```
RRCResumeRequest1 ::=              SEQUENCE {
    rrcResumeRequest1                 RRCResumeRequest1-IEs
}
RRCResumeRequest1 -IEs ::=         SEQUENCE {
    resumeIdentity                    I-RNTI-Value,
    resumeMAC-I                       BIT STRING (SIZE (16)),
    resumeCause                       ResumeCause,
    spare                             BIT STRING (SIZE (1))
}
```

Referring to Table 1, the RRC resume request message may include one temporary identifier assigned by the base station to the UE in the inactive state. For example, the RRC resume request message may include one Inactive-Radio Network Temporary Identifier (I-RNTI) assigned for the first UE 601 by the second base station 606. The RRC resume request message may include an information element (IE) including the one I-RNTI (i.e., first temporary identifier) assigned for the first UE 601 by the second base station 606.

In step S630, the first UE 601 may transmit, to the first base station 605, the RRC resume request message including the first temporary identifier assigned from the previously connected second base station 606. The RRC resume request message transmitted in step S630 may further include information on a cause for resume (e.g., resumeCause). The first temporary identifier may be used for recovery of UE context. In addition, the first temporary identifier may be used as a UE identifier in a RAN paging process.

The first base station 605 may transmit a signal including at least a part of the message and/or information received in step S630 to the second base station 606 (S640). The second base station 606 may receive the signal transmitted from the first base station 605 (S640). For example, in step S640, the first base station 605 may transmit, to the second base station 606, a UE context recovery request message including information on the first temporary identifier included in the RRC resume request message received in step S630. The UE context recovery request message may be a RetriveUeContextRequest message. The second base station 606 may transmit a UE context recovery response message, which is a response to the UC context recovery request message received in step S640, to the first base station 605 (S645).

The first base station 605 may transmit a signal corresponding to a response to the RRC resume request message received in step S630 to the first UE 601 (S650). The first UE 601 may receive the signal transmitted from the first base station 605. In step S650, the first base station 605 may transmit an RRC resume message or an RRC release message to the first UE 601. The RRC resume message may be an RRCResume message. The RRC release message may be an RRCRelease message. The first base station 605 may transmit the RRC resume message or RRC release message to the first UE 601 based on the UE context recovery response message received in step S645 (S650).

Meanwhile, the first base station 605 may transmit a path switching request message to the CN 607 based on the UE context recovery response message received in step S645 (S660). The path switching request message may be a PathSwitchRequest message. The CN 607 may receive the path switching request message transmitted from the first base station 605 (S660). The CN 607 may transmit a response signal or a feedback signal to the path switching request message received in step S660 to the first base station 605 (S665). The signal transmitted in step S665 may be PathSwitchRequestAck. The first base station 605 may transmit a message requesting or indicating release of the UE context for the first UE 601 to the second base station 606 (S670). The second base station 606 may receive the message transmitted from the first base station 605 (S670). The message transmitted in step S670 may be a UeContextRelease message. The second base station 606 may release the UE context for the first UE 601 based on the message received in step S670. The signaling operations according to steps S660 to S670 and corresponding operations may be omitted.

Figure 7A:
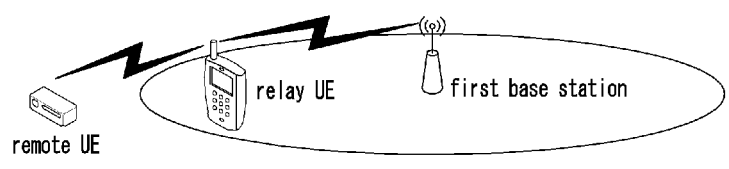
FIGS. 7A to 7C are conceptual diagrams for describing exemplary embodiments of sidelink-based relay scenarios in a communication system.
Figure 7B:
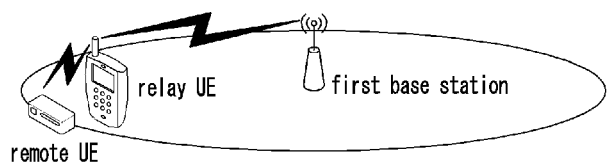
Figure 7C:
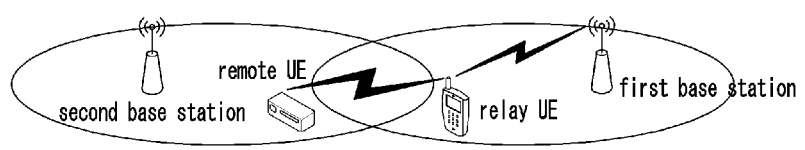

FIGS. 7A to 7C are conceptual diagrams for describing exemplary embodiments of sidelink-based relay scenarios in a communication system.

Referring to FIGS. 7A to 7C, in an exemplary embodiment of the communication system, due to a commercial service or public safety service, each terminal may need to be connected to a base station to transmit/receive data. Here, among terminals, a terminal having easy direct communication with the base station may be directly connected to the base station to transmit/receive data. On the other, among the terminals, a terminal having difficulty in direct communication with the base station may be indirectly connected to the base station through relaying of a relay terminal to transmit/receive data. A terminal relaying a connection between another terminal and the base station may be referred to as 'relay terminal (UE)'. Meanwhile, a terminal connected to the base station through relaying of the relay terminal may be referred to as 'remote terminal (UE)'. Here, a connection between the remote terminal and the base station may be referred to as 'indirect connection'. The communication system may support multiple sidelink-based relay scenarios. In other words, an indirect connection between a remote terminal and a base station through a relay terminal may be classified into a plurality of types of scenarios.

Referring to FIG. 7A, when a relay terminal located within an coverage of a base station (i.e., in-coverage (IC) terminal) relays an indirect connection between a remote terminal located outside the coverage of the base station (i.e., out of coverage (00C) terminal) and the base station may be referred to as 'Scenario #1'. For example, the relay terminal located within the coverage of the first base station (or first cell) may relay an indirect connection between the remote terminal located outside the coverage of the first base station and the first base station. The indirect connection formed in this manner may correspond to Scenario #1.

Referring to FIG. 7B, a case in which a relay terminal located within a coverage of a base station relays an indirect connection between a remote terminal located within the coverage of the base station and the base station may be referred to as 'Scenario #2'. For example, the relay terminal located within the coverage of the first base station (or first cell) may relay an indirect connection between the remote terminal located within the coverage of the first base station and the first base station. The indirect connection formed in this manner may correspond to Scenario #2.

Referring to FIG. 7C, a case in which a relay terminal relays an indirect connection between its own serving base station and a remote terminal located within a coverage of a base station other than the serving base station may be referred to as 'Scenario #3'. For example, the relay terminal located within a coverage of a first base station (or first cell) may relay an indirect connection between the first base station and a remote terminal located within a coverage of a second base station, not the first base station. The indirect connection formed in this manner may correspond to Scenario #3.

Figure 8:
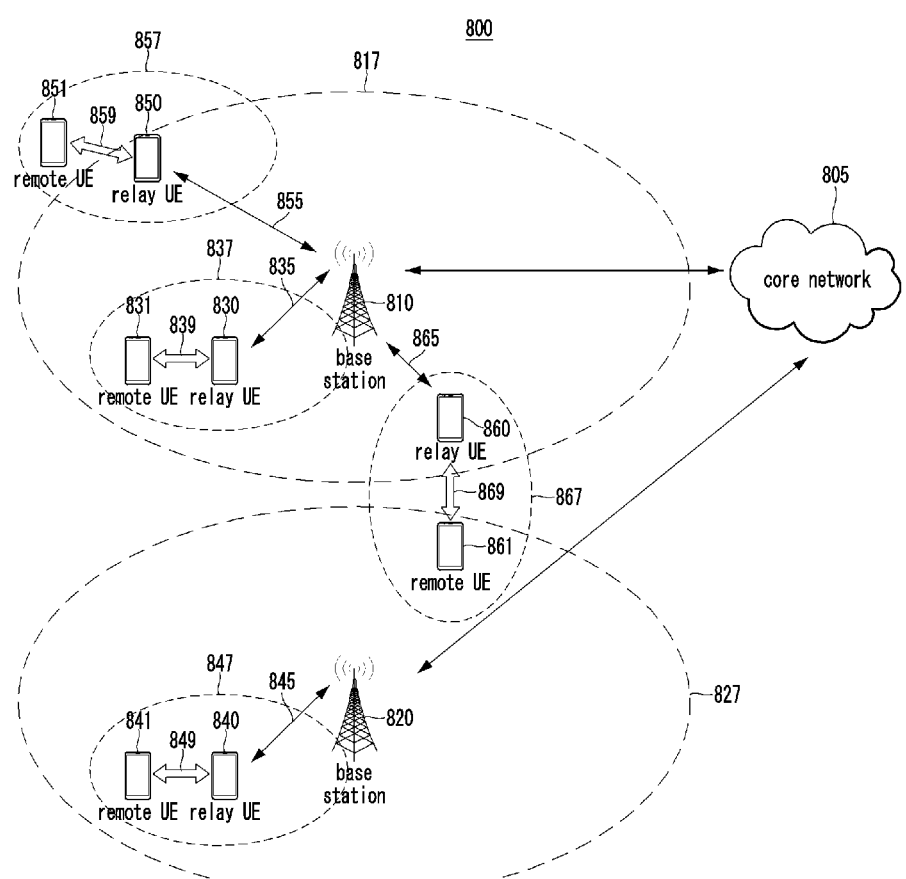
FIG. 8 is a conceptual diagram for describing an exemplary embodiment of a communication system supporting a sidelink based relay.

FIG. 8 is a conceptual diagram for describing an exemplary embodiment of a communication system supporting a sidelink based relay.

Referring to FIG. 8, a communication system 400 may include one or more base stations (BSs) and one or more terminals (e.g., user equipments (UEs)). The one or more base stations may form cell coverage(s) in a predetermined communicable area to provide services to terminals within the cell coverage(s). Among the one or more terminals, a terminal located within the cell coverage(s) of the one or more base stations may access the communication network and receive services by being connected to the base station(s) forming the cell coverage(s). Alternatively, some of the one or more terminals may not be directly connected to the one or more base stations, but may access the communication network by being indirectly connected to the one or more base stations through relaying of another terminal. In FIG. 8, a communication system including two base stations and a plurality of terminals is shown as an example. However, this is only an example for convenience of description, and the communication system supporting a sidelink based relay is not limited thereto.

In an exemplary embodiment, the communication system 800 may include a core network (CN) 805, a first base station 810, a second base station 820, and a plurality of terminals 830, 831, 840, 841, 850, 851, 860, and 861. The core network 805 may be the same as or similar to the core network described with reference to FIG. 1. The first and second base stations 810 and 820 may be the same as or similar to the base stations 110-1, 110-2, 110-3, 120-1 and 120-2 described with reference to FIG. 1. Each of the plurality of terminals 830, 831, 840, 841, 850, 851, 860, and 861 may be the same as or similar to the terminals 130-1, 130-2, 130-3, 130-4, 130-5, and 130-6 described with reference to FIG. 1. The plurality of terminals 830, 831, 840, 841, 850, 851, 860, and 861 may be referred to as 'first terminal 830', 'second terminal 831', 'third terminal 840', 'fourth terminal 841', 'fifth terminal 850', 'sixth terminal 851', 'seventh terminal 860', and 'eighth terminal 861', respectively.

The first and second base stations 810 and 820 may be connected to the core network 805. The first and second base stations 810 and 820 may form cell coverages 817 and 827 in a predetermined communicable area, and provide services to terminals within the cell coverages 817 and 827. For example, among the plurality of terminals 830, 831, 840, 841, 850, 851, 860, and 861 included in the communication system 800, the first, second, fifth, and seventh terminals 830, 831, 850, and 860 located within the cell coverage 817 of the first base station 810 may access the core network 805 or the communication network by being connected to the first base station 810. Among the plurality of terminals 830, 831, 840, 841, 850, 851, 860, 861 included in the communication system 800, the third, fourth, and eighth terminals 840, 841, and 861 located within the cell coverage 827 of the second base station 820 may access the core network 805 or the communication network by being connected to the second base station 820.

Meanwhile, some of the plurality of terminals 830, 831, 840, 841, 850, 851, 860, and 861 may not be directly connected to the first base station 810 or the second base station 820, but may be indirectly connected to the first base station 810 or the second base station 820 through relaying of other terminal(s). For example, the sixth terminal 851 may not be directly connected to the first base station 810 because it is located outside the cell coverage of the first base station 810. The sixth terminal 851 may access the network by being indirectly connected to the first base station 810 through relaying of the fifth terminal 850 connected to the first base station 810. In other words, the fifth terminal 850 may relay a connection between the sixth terminal 851 located within a predetermined communicable area 857 and the first base station 810. Meanwhile, even in case of a terminal located within the cell coverage 817 or 827 of the first base station 810 or the second base station 820, such as the second terminal 831 or the fourth terminal 841, a situation in which a channel condition with each base station 810 or 820 is not excellent may occur due to various reasons. For example, the second terminal 831 is located within the cell coverage 817 of the first base station 810, but is located in a shadow region caused by buildings or obstacles, so that direct communication with the first base station 810 may not be easy. In this case, the second terminal 831 may access the network by being indirectly connected to the first base station 810 through relaying of the first terminal 830 that easily performs direct communication with the first base station 810. In other words, the first terminal 830 may relay a connection between the second terminal 831 located within a predetermined communicable area 837 and the first base station 810. Meanwhile, the fourth terminal 841 is located within the cell coverage 827 of the second base station 820, but direct communication between the fourth terminal 8410 and the second base station 820 may not be easy due to obstacles on a communication path with the second base station 820. In this case, the fourth terminal 841 may access the core network 705 by being indirectly connected to the second base station 820 through relaying of the third terminal 840 that easily performs direct communication with the second base station 820. In other words, the third terminal 840 may relay a connection between the fourth terminal 841 located within a predetermined communicable area 847 and the second base station 820.

Meanwhile, the seventh terminal 860 located within the cell coverage 817 of the first base station 810 may relay a connection between the first terminal 810 and the eighth terminal 861 which is located outside the cell coverage 817 of the first base station 810 and is located within the cell coverage 827 of the second base station 820.

Here, the first, third, fifth, and seventh terminals 830, 840, 850, and 860 relaying the connections between the first and second base stations 810 and 820 and the second, fourth, sixth, and eighth terminals 831, 841, 851, and 861 may be referred to as 'relay terminals (relay UEs)'. Meanwhile, the second, fourth, sixth, and seventh terminals 831, 841, 851, and 861 which are connected to the first and second base stations 810 and 820 through relaying of the first, third, fifth, and seventh terminals 830, 840, 850, and 860 may be referred to as 'remote terminals (remote UEs)'. In an exemplary embodiment of the communication system 800, a connection between the relay terminal and the remote terminal may be configured in a sidelink manner. For example, the connections between the first, third, fifth, and seventh terminals 830, 840, 850, and 860, which are relay terminals, and the second, fourth, sixth, and eighth terminals 831, 841, 851, and 861, which are remote terminals, may be configured as PC5 interfaces 839, 849, 859, and 869. On the other hand, connections between the first, third, fifth, and seventh terminals 830, 840, 850, and 860, which are relay terminals, and the first and second base stations 810 and 820 may be configured as Uu interfaces 835, 845, 855, and 865.

The indirect connections between the remote terminals 831, 841, 851, and 861 and the base stations 810 and 820 through the relay terminals 830, 840, 850, and 860 may be classified into a plurality of types of scenarios. For example, the indirect connection between the sixth terminal 851 and the first base station 810 relayed by the fifth terminal 850 may correspond to Scenario #1 described with reference to FIG. 7A. The indirect connection between the second terminal 831 and the first base station 810 relayed by the first terminal 830, and the indirect connection between the fourth terminal 841 and the second base station 820 relayed by the third terminal 840 may correspond to Scenario #2 described with reference to FIG. 7B. The indirect connection between the eighth terminal 861 and the first base station 820 relayed by the seventh terminal 860 may correspond to Scenario #3 described with reference to FIG. 7C.

The relay terminals 830, 840, 850, and 860 relaying the connection between the base stations 810 and 820 and the remote terminals 831, 841, 851, and 861 may be regarded as performing roles of UE-to-Network (U2N) relays. Based on the U2N relaying of the relay terminals 830, 840, 850, and 860, the coverages of the base stations 810 and 820 may be extended. Alternatively, based on the U2N relaying of the relay terminals 830, 840, 850, and 860, the services of the base stations 810 and 820 may be provided more reliably.

Sidelink and Relay Terminal

In communication between terminals (i.e., device-to-device (D2D) communication), the terminals may be connected to each other through a sidelink to perform communication such as data transmission and reception. Radio signal transmission/reception in the sidelink may be performed in such a manner that a receiving terminal receives a radio signal transmitted by a corresponding transmitting terminal.

In an exemplary embodiment of the communication system, a plurality of terminals may perform sidelink communication by using the same or different radio frequencies or the same radio frequency band. The plurality of terminals may perform the sidelink communication by using the same or different radio resources. A transmitting terminal may provide control information such as radio resource information to a receiving terminal prior to data transmission.

The function of the sidelink communication in the wireless communication network may be configured with an interface between terminals performing the sidelink communication and an interface with a sidelink server controlling the sidelink communication of the terminals. Here, the sidelink server may exchange or provide information related to the sidelink communication by exchanging messages with the terminal. The sidelink server may correspond to a base station or may be connected to the terminal through the base station. For example, the base station may be located on a path between the sidelink server and the terminal, and may mutually transmit packets exchanged between the sidelink server and the terminal. In an exemplary embodiment of the sidelink communication, the connection between the terminals may be configured through a PC5 interface, and the connection between the terminal and the sidelink server may be configured through a PC3 interface or a Uu interface.

A sidelink may be configured between a pair of terminals adjacent to each other. In order to configure sidelink communication, an operation of selecting or discovering adjacent terminals in advance may be required. The terminal may transmit/receive a radio signal for discovering adjacent terminals in order to perform sidelink communication. In an exemplary embodiment of the communication system, the first terminal may transmit a discovery signal for discovering adjacent terminals in a broadcast manner. Here, the discovery signal may include information related to the first terminal, such as identification information of the first terminal. The second terminal adjacent to the first terminal may receive the discovery signal transmitted from the first terminal. The second terminal may transmit a response to the discovery signal based on the discovery signal from the first terminal. When the first terminal transmits a response(s) to the response(s) to the discovery signal(s) from one or more adjacent terminals such as the second terminal, the discovery procedure of the first terminal for the adjacent terminals may be completed. The terminal having discovered adjacent terminal(s) may report information on the discovered adjacent terminal(s) to the sidelink server. Alternatively, each terminal may report information related to its own location to the sidelink server. The sidelink server may identify information on the mutually adjacent terminals based on the report from each terminal. For example, based on the discovery result information or location information included in the report from the connected first terminal, the sidelink server may identify information on the second terminal adjacent to the first terminal, or information that the first terminal and the second terminal are in a mutually adjacent relationship.

In sidelink communication, a transmitting terminal may transmit control information including information on resources allocated for data transmission to a receiving terminal. The transmitting terminal may transmit data to the receiving terminal based on information on the resources allocated for data transmission included in the control information. A resource for the transmitting terminal to perform sidelink data transmission to the receiving terminal may be determined by the transmitting terminal or the base station.

Radio resources used in the sidelink may be operated in units of a channel according to their use. For example, physical channels of sidelink may include a physical sidelink broadcast channel (PSBCH), a physical sidelink control channel (PSCCH), a physical sidelink shared channel (PSSCH), a physical sidelink feedback channel (PSFCH), and the like. Here, the PSBCH may refer to a channel for transmitting broadcast information through a sidelink. The PSCCH may refer to a channel for transmitting sidelink control information. Here, the sidelink control information may include, for example, a sidelink primary synchronization signal (S-PSS) and a sidelink secondary synchronization signal (S-SSS) including a synchronization signal, and a channel state information reference signal (CSI-RS) for sidelink channel measurement. The PSSCH may refer to a channel for transmitting sidelink data. The PSFCH may refer to a channel transmitted by the receiving terminal for feedback to the sidelink data transmitted from the transmitting terminal. For example, the receiving terminal receiving the data transmitted through the sidelink may transmit, to the transmitting terminal, a feedback signal based on whether the reception is successful. The PSFCH may be used independently by one terminal or shared by a plurality of terminals.

A relay terminal may relay radio signals such as control signals and data between the communication network and a remote terminal. The relay terminal and the remote terminal may be connected through a PC5 interface of the sidelink to perform mutual radio signal transmission and reception. On the other hand, the relay terminal and the base station may be connected through a Uu interface to perform mutual radio signal transmission and reception. For example, the relay terminal may transmit a downlink (DL) radio signal transmitted from the base station or the communication network through the Uu interface to the remote terminal through the PC5 interface. On the other hand, the relay terminal may transmit an uplink (UL) radio signal transmitted from the remote terminal through the PC5 interface to the base station or the communication network through the Uu interface.

Figure 9A:
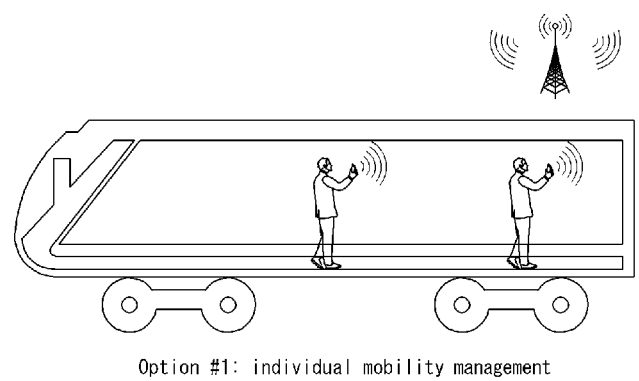
FIGS. 9A and 9B are conceptual diagrams for describing an exemplary embodiment of a sidelink-based mobile relay technique in a communication system.
Figure 9B:
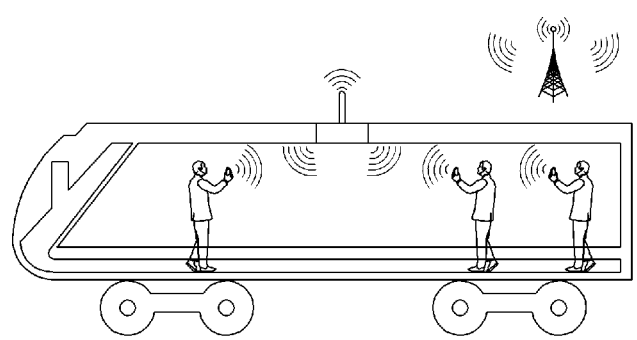

FIGS. 9A and 9B are conceptual diagrams for describing an exemplary embodiment of a sidelink-based mobile relay technique in a communication system.

Referring to FIGS. 9A and 9B, a communication system may or may not support a mobile sidelink-based relay. The sidelink-based relay may refer to a relay based on a sidelink between mobile terminals (or UEs). The sidelink-based relay may also be referred to as 'mobile relay'.

Referring to FIG. 9A, each of terminals in the communication system may perform direct communication with a base station. A case in which each of the terminals directly communicates with the base station as described above may be referred to as 'Option #1'. The mobile relay technique may not be applied in a communication situation according to Option #1.

As in Option #1, when each of the terminals performs direct communication with the base station, mobility management may be individually performed. That is, when each of the terminals performs direct communication with the base station, mobility management may be performed separately or independently for individual terminals.

As shown in FIG. 9A, when communication is performed according to Option #1 in a situation where a plurality of users are on a transportation means (e.g., vehicle, train, etc.), a path loss or penetration loss may be considerably large. In addition, as signaling operations for mobility management are individually performed for each of a plurality of terminals, a large load may be generated in the network.

On the other hand, referring to FIG. 9B, one or more terminals in a communication system may communicate with a base station based on the mobile relay technique or the like. A case in which one or more terminals communicate with the base station based on the mobile relay technique may be referred to as 'Option #2'.

As in Option #2, when terminals communicate with the base station based on the mobile relay technique, a plurality of remote terminals may communicate with the base station through one relay terminal. In this situation, mobility management for the plurality of remote terminals may be performed individually or on a group basis. For example, mobility management for the remote terminals may be performed individually for each of the remote terminals. Alternatively, mobility management for the remote terminals may be commonly performed for the one or more remote terminals connected to the base station by being connected to a relay terminal or camped on the relay terminal.

As shown in FIG. 9B, when communication is performed according to Option #2 in a situation where a plurality of users are on a transportation means, a path loss or penetration loss may be relatively small. When mobility management for a plurality of terminals is performed on a group basis, the amount of load generated in the network may be reduced. In the mobile relay technique, a technique for improving efficiency of a group-based mobility management procedure may be required.

Figure 10A:
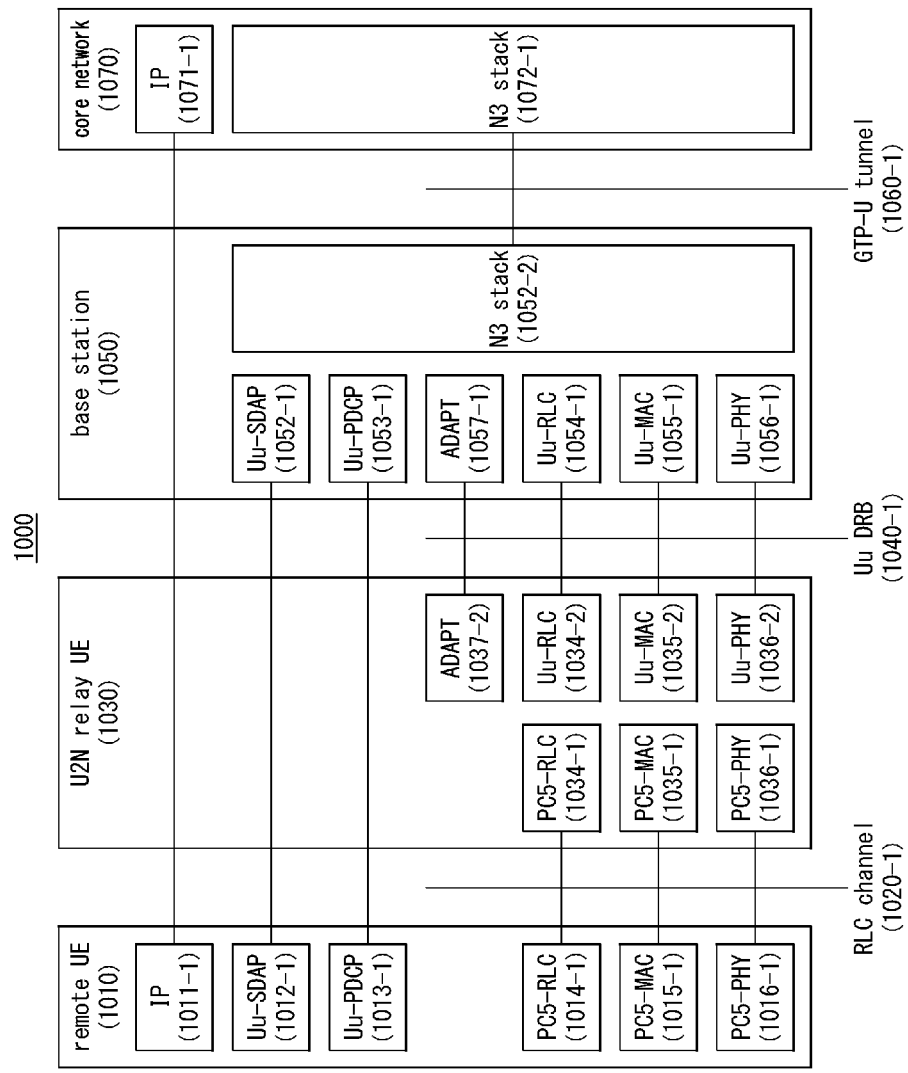
FIGS. 10A and 10B are conceptual diagrams for describing exemplary embodiments of a layer 2 (L2) relay protocol structure in a communication system supporting a sidelink-based relay.
Figure 10B:
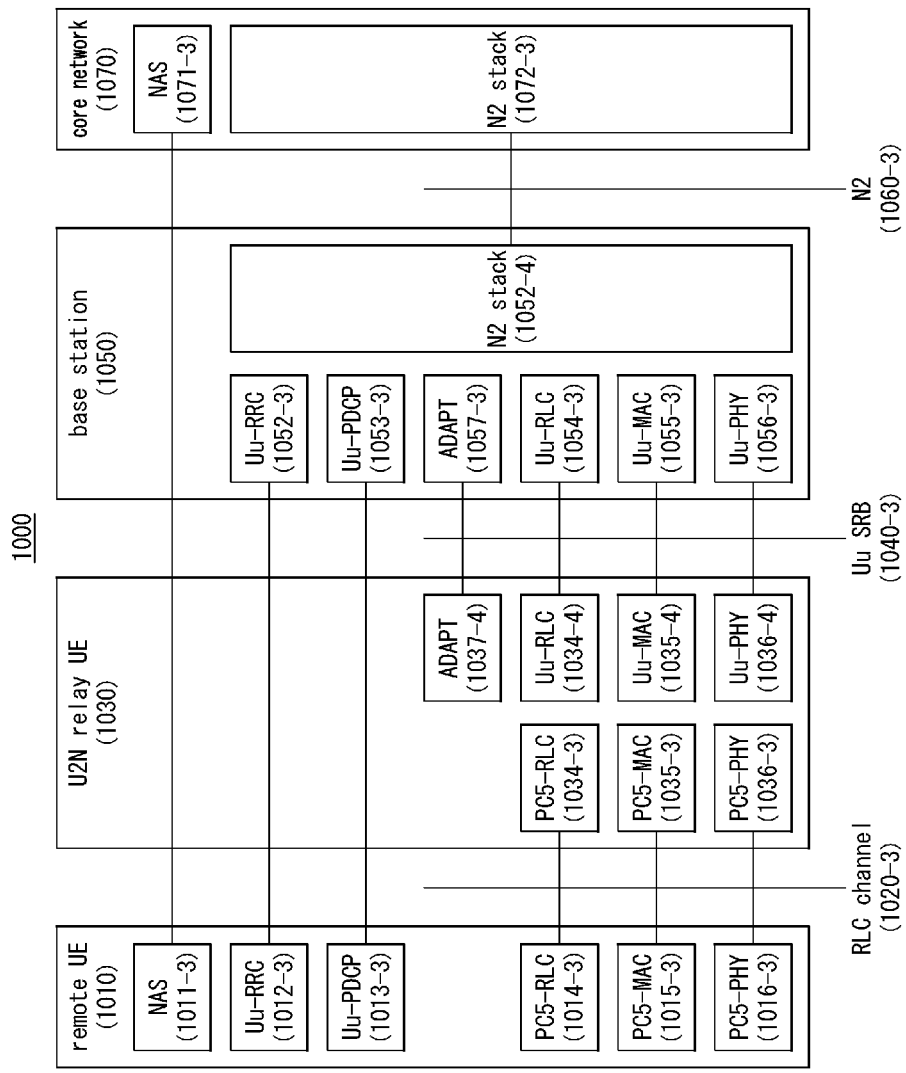

FIGS. 10A and 10B are conceptual diagrams for describing exemplary embodiments of a layer 2 (L2) relay protocol structure in a communication system supporting a sidelink-based relay.

Referring to FIGS. 10A and 10B, a communication system 1000 may include a remote terminal 1010, a relay terminal 1030, a base station 1050, and a core network (CN) 1070. Here, the core network 1070 may be the same as or similar to the core network described with reference to FIG. 1 or the core network 805 described with reference to FIG. 8. The core network 1070 may correspond to a 5G core network. The base station 1050 may be configured identically or similarly to the first and second base stations 810 and 820 described with reference to FIG. 8. The base station 1050 may correspond to an eNodeB (eNB), gNodeB (gNB), or the like. The remote terminal 1010 may be the same as or similar to the second, fourth, sixth, and eighth terminals 831, 841, 851, and 861 described with reference to FIG. 8. The relay terminal 1030 may be the same as or similar to the first, third, fifth, and seventh terminals 830, 840, 850, and 860 described with reference to FIG. 8. The relay terminal 1030 may relay communication between the remote terminal 1010 and the base station 1050. The remote terminal 1010 may be connected to the base station 1050 and the core network 1070 through the relay terminal 1030. The relay terminal 1030 may be referred to as a 'UE-to-Network (U2N)' relay terminal.

The relay terminal 1030 may map links of the respective interfaces through the relay function, and route data according to the structure of mapped links. Depending on a protocol to which the relay function is applied, links identified in the protocol may be applied. The link used here may be configured based on an Internet protocol (IP) address, QoS Flow, radio bearer (RB), RLC channel, logical channel, transport channel, and the like. The operation of mapping the links may also be referred to as an operation of associating the links. In the operation of mapping the links, a destination of a signal or data may be identified by identifying a link mapped with a link of the received signal or data. Such the operation may be referred to as routing for signals or routing for data.

The relay terminal may configure sidelink(s) with one or more remote terminals. In a sidelink, one or more connections may be configured according to the type of traffic for each remote terminal. One connection may be configured or a plurality of connections may be configured between one relay terminal and one remote terminal.

FIGS. 10A and 10B show a connection relationship between one remote terminal 1010, one relay terminal 1030, and one base station 1050. However, this is only an example for convenience of description, and exemplary embodiments of the L2 relay protocol structure are not limited thereto. For example, in another exemplary embodiment of the communication system 1000, one relay terminal may configure sidelink connection(s) with a plurality of remote terminals. Alternatively, one relay terminal may configure a plurality of connections with one remote terminal based on a plurality of mutually distinguished radio bearers. FIGS. 10A and 10B show a first exemplary embodiment of a user plane protocol structure and a control plane protocol structure for supporting a relay function in a wireless communication system.

Referring to FIG. 10A, in the user plane protocol structure for supporting the relay function in the communication system 1000, the core network 1070 may transmit and receive user data with the remote terminal 1010 through the base station 1050 and the relay terminal 1030 based on a preconfigured protocol structure or protocol stack. In the communication system 1000 supporting 5G communication, the user plane protocol structure may include a non-access stratum (NAS) protocol and an access stratum (AS) protocol. The NAS protocol is a protocol for signal transmission between the terminal and the core network, and may be configured to include an IP layer and the like. The AS protocol may be a protocol for signal transmission between the terminal and the base station, and may include a service data adaptation protocol (SDAP) layer, a packet data convergence protocol (PDCP) layer, a radio link control (RLC) layer, a media access control (MAC) layer, a physical (PHY) layer, and the like. In the IP layer, application data from an upper layer may be delivered to a lower layer in form of data packets or IP packets. In the SDAP layer, classification of quality-of-(QoS) flows may be performed based on header information of IP packets or Ethernet frames received from the upper layer, and the QoS flows may be mapped to data radio bearers (DRBs). More specifically, the SDAP layer may perform or provide functions related to mapping between the QoS flows and the data radio bearers, marking of QoS flows, ID (i.e., QFI), etc. on downlink packets and uplink packets, and the like. The PDCP layer may sequentially deliver user data and may perform header compression and encryption functions. The RLC layer may operate in one operation mode among a transport mode (TM), an unacknowledged mode (UM), and an acknowledged mode (AM) to ensure various QoS required by a plurality of radio bearers. In addition, the RLC layer may correct errors through an automatic repeat request (ARQ) function.

The MAC layer may map logical channels to physical channels. The MAC layer may generate a transport block by multiplexing MAC service data units (MAC SDUs). The MAC layer may deliver the transport block through the PHY layer, and may obtain the MAC SDUs by demultiplexing the transport block received through the PHY layer. In addition, the MAC layer may correct errors through a hybrid automatic repeat request (HARD) function.

The PHY layer may exchange data with the upper layer of the AS protocol by using physical channels. The physical channels may exchange data with the upper layer of the AS protocol by using a data modulation scheme such as orthogonal frequency division multiplexing (OFDM). The PHY layers may utilize radio resources and may specifically utilize time resources and frequency resources. The PHY layer may be connected to the MAC layer through transport channels.

When the connection between the remote terminal 1010 and the base station 1050 is configured through relaying of the relay terminal 1030, in the first exemplary embodiment of the user plane protocol structure for supporting the relay function, an IP layer 1011-1 of the remoted terminal 1010 may be connected to an IP layer 1071-1 of the core network 1070.

In the SDAP layer and the PDCP layer, the remote terminal 1010 may be connected to the base station 1050 through a Uu interface. In other words, the SDAP layer and the PDCP layer may be terminated at the link between the remote terminal 1010 and the base station 1050. A Uu-SDAP layer 1012-1 of the remote terminal 1010 may be connected to a Uu-SDAP layer 1052-1 of the base station. A Uu-PDCP layer 1013-1 of the remote terminal 1010 may be connected to a Uu-PDCP layer 1053-1 of the base station.

In the first exemplary embodiment of the user plane protocol structure shown in FIG. 10A, the PDCP layers and the SDAP layers may be located in the remote terminal 1010 and the base station 1050, and may operate as peer-to-peer protocols between them. A retransmission function may be performed for each interface, and data order assurance and security functions may be performed between ends of the remote terminal 1010 and the base station 1050. In particular, key distribution required for the security function performed in the PDCP layer may be provided through the relay terminal 1030.

On the other hand, in the RLC layer, the MAC layer, and the PHY layer, the remote terminal 1010 may be connected to the relay terminal 1030 through a PC5 interface for sidelink, and the relay terminal 1030 may be connected to the base station 1050 through a Uu interface. In other words, the RLC layer, the MAC layer, and the PHY layer may be terminated at the link between the remote terminal 1010 and the relay terminal 1030, and at the link between the relay terminal 1030 and the base station 1050. A PC5-RLC layer 1014-1 of the remote terminal 1010 may be connected to a PC5-RLC layer 1034-1 of the relay terminal 1030. A PC5-MAC layer 1015-1 of the remote terminal 1010 may be connected to a PC5-MAC layer 1035-1 of the relay terminal 1030. A PC5-PHY layer 1016-1 of the remote terminal 1010 may be connected to a PC5-PHY layer 1036-1 of the relay terminal 1030. A Uu-RLC layer 1034-2 of the relay terminal 1030 may be connected to a Uu-RLC layer 1054-1 of the base station 1050. A Uu-MAC layer 1035-2 of the relay terminal 1030 may be connected to a Uu-MAC layer 1055-1 of the base station 1050. A Uu-PHY layer 1036-2 of the relay terminal 1030 may be connected to a Uu-PHY layer 1056-1 of the base station 1050. An N3 stack 1052-2 of the base station 1050 may be connected to an N3 stack 1072-1 of the core network 1070. The base station 1050 may be connected to a UPF, which is a user plane function of the core network 1070, through an N3 interface. Data may be transmitted/received between the remote terminal 1010 and the relay terminal 1030 based on an RLC channel 1020-1. Data may be transmitted/received between the relay terminal 1030 and the base station 1050 based on a Uu-DRB 1040-1. Data may be transmitted/received between the base station 1050 and the core network 1070 based on a general packet radio service (GPRS) tunneling protocol (GTP)-U tunnel 1060-1 based on a GTP.

A Uu-SDAP layer 1052-1 and a Uu-PDCP layer 1053-1 of the base station 1050 may be configured for each of connected one or more remote terminals 1010 and one or more relay terminals 1030. In other words, the number of Uu-SDAP layers 1052-1 and Uu-PDCP layers 1053-1 of the base station 1050 may be the same as the number of connected terminals 1010 and 1030. Meanwhile, the Uu-RLC layer 1054-1, the Uu-MAC layer 1055-1, and the Uu-PHY layer 1056-1 of the base station 1050 may be configured for each of one or more connected relay terminals 1030. In other words, the number of Uu-RLC layers 1054-1, Uu-MAC layers 1055-1, and Uu-PHY layers 1056-1 of the base station 1050 may be the same as the number of connected relay terminals 1030. The PC5-RLC layer 1034-1, the PC5-MAC layer 1035-1, and the PC5-PHY layer 1036-1 of the relay terminal 1030 may be configured for each of the connected one or more remote terminals 1010. In other words, the number of PC5-RLC layers 1034-1, PC5-MAC layers 1035-1, and PC5-PHY layers 1036-1 of the relay terminals 1030 may be the same as the number of connected one or more remote terminals 1010.

An adaptation layer may be further defined in the user plane protocol structure of the communication system 1000. In an exemplary embodiment, the adaptation layer may be a layer higher than the RLC layer. The adaptation layer may be used to effectively configure connection(s) or routing for multiplexing between the base station 1050 and one or more remote terminals 1010. The adaptation layer may perform an RLC channel mapping function between the base station 1050 and the relay terminal 1030.

In the first exemplary embodiment of the user plane protocol structure shown in FIG. 10A, the adaptation layer may be supported in the Uu interface between the base station 1050 and the relay terminal 1030, and may not be supported in the PC5 interface between the remote terminal 1010 and the relay terminal 1030. The adaptation layer may be configured above the RLC layer of the Uu interface (i.e., Uu-RLC layers 1034-2 and 1054-1) in the relay terminal 1030 and the base station 1050. The adaptation layer 1037-2 of the relay terminal 1030 may be connected to the adaptation layer 1057-1 of the base station 1050. The adaptation layer 1037-2 of the relay terminal 1030 and the adaptation layer 1057-1 of the base station 1050 may obtain multiplexing identification information for mapping or routing of each data unit with respect to each data unit delivered from the lower layers, the Uu-RLC layer 1034-2 of the relay terminal 1030 and the Uu-RLC layer 1054-1 of the base station 1050, respectively. Here, the multiplexing identification information may be identification information defined or configured by an entity supporting the function of the Uu-RRC layer 1052-3 on the control plane protocol structure of the base station 1050 whenever each remote terminal 1010 is connected to the base station 1050 through the relay terminal 1030. The multiplexing identification information may refer to identification information for mapping or routing for each remote terminal 1010 or for each radio bearer. Each multiplexing identification information may be delivered from the base station 1050 to the relay terminal 1030. Each multiplexing identification information may be stored in the adaptation layer 1037-2 of the relay terminal 1030 and the adaptation layer 1057-1 of the base station 1050, and may be added to a data unit delivered from the remote terminal 1010 or the core network 1070 for identification of the data unit. The adaptation layer 1037-2 of the relay terminal 1030 and the adaptation layer 1057-1 of the base station 1050 may identify or obtain the multiplexing identification information unique to each data unit from the data unit delivered from the PC5-RLC layer 1034-1 of the relay terminal 1030 and the Uu-PDCP layer 1053-1 of the base station 1050, respectively. The adaptation layer 1037-2 of the relay terminal 1030 and the adaptation layer 1057-1 of the base station 1050 may add the multiplexing identification information for mapping or routing to the data unit delivered from the PC5-RLC layer 1034-1 of the relay terminal 1030 and the Uu-PDCP layer 1053-1 of the base station 1050, respectively.

For example, a plurality of first entities supporting functions of the PC5-RLC layer 1034-1 of the relay terminal 1030 may deliver a plurality of data units to be transmitted to the base station 1050 of the relay terminal 1030 to a second entity performing functions of the adaptation layer 1037-2 of the relay terminal 1030. The second entity performing functions of the adaptation layer 1037-2 of the relay terminal 1030 may generate a multiplexed uplink (UL) data unit by multiplexing the plurality of data units. A header of the multiplexed UL data unit generated by the second entity may include multiplexing identification information corresponding to each of the plurality of remote terminals 1010 having transmitted the plurality of data units to be transmitted to the base station 1050. The multiplexed UL data unit may be transmitted to the base station 1050. A third entity supporting functions of the Uu-RLC layer 1054-1 of the base station 1050 may deliver the multiplexed UL data unit received from the relay terminal 1030 to a fourth entity performing functions of the adaptation layer 1057-1 of the base station 1050. Based on the multiplexing identification information included in the header of the multiplexed UL data unit received from the relay terminal 1030, the fourth entity performing function of the adaptation layer 1057-1 of the base station 1050 may identify or obtain the plurality of data units transmitted from the plurality of remote terminals 1010. The base station 1050 may transmit the plurality of data units identified or obtained by the fourth entity performing functions of the adaptation layer 1057-1 to the core network 1070.

On the other hand, the fourth entity performing functions of the adaptation layer 1057-1 of the base station 1050 may receive, from the plurality of third entities supporting functions of the Uu-PDCP layer 1054-1 of the base station 1050, the plurality of data units to be transmitted to the plurality of remote terminals 1010 respectively corresponding thereto. The fourth entity may multiplex the plurality of data units to generate a multiplexed DL data unit. A header of the multiplexed DL data unit generated by the fourth entity may include multiplexing identification information corresponding to each of the plurality of remote terminals 1010 to which the multiplexed plurality of data units are to be transmitted. The multiplexed DL data unit may be transmitted to the relay terminal 1030. The first entity supporting functions of the Uu-RLC layer 1034-2 of the relay terminal 1030 may deliver the multiplexed DL data unit received from the base station 1050 to the second entity performing functions of the adaptation layer 1037-2 of the relay terminal 1030. The second entity may identify or obtain the plurality of data units to be respectively transmitted to the plurality of remote terminals 1010 based on the multiplexing identification information included in the header of the multiplexed DL data unit received from the base station 1050. The relay terminal 1030 may transmit each of the plurality of data units identified or obtained by the second entity to the corresponding remote terminal 1010.

Referring to FIG. 10B, in the first exemplary embodiment of the control plane protocol structure for supporting the relay function in the communication system 1000, the core network 1070 may transmit and receive a control signal to and from the remote terminal 1010 through the base station 1050 and the relay terminal 1030 based on the preconfigured protocol structure or protocol stack. Hereinafter, in describing the first exemplary embodiment of the control plane protocol structure for supporting the relay function in the wireless communication system with reference to FIG. 10B, content overlapping with that described with reference to FIG. 10A will be omitted.

The control plane structure may include a NAS layer, a radio resource control (RRC) layer, a PDCP layer, an RLC layer, a MAC layer, a PHY layer, and the like. The RRC layer may perform a configuration function, reconfiguration function, and release function on radio bearer(s). The RRC layer may perform control functions on logical channels, transport channels, and physical channels.

In the first exemplary embodiment of the control plane protocol structure for supporting the relay function, the NAS layer 1011-3 of the remote terminal 1010 may be connected with the NAS layer 1071-3 of the core network 1070. In the RRC layer and the PDCP layer, the remote terminal 1010 may be connected to the base station 1050 through a Uu interface. In other words, the RRC layer and the PDCP layer may be terminated at the link between the remote terminal 1010 and the base station 1050. The Uu-RRC layer 1012-3 of the remote terminal 1010 may be connected to the Uu-RRC layer 1052-3 of the base station. The Uu-PDCP layer 1013-3 of the remote terminal 1010 may be connected to the Uu-PDCP layer 1053-3 of the base station. The PDCP layers and the RRC layers may be located in the remote terminal 1010 and the base station 1050 and may operate as peer-to-peer protocols between them. In particular, key distribution required for security functions performed in the PDCP layer may be provided via the relay terminal.

On the other hand, in the RLC layer, the MAC layer, and the PHY layer, the remote terminal 1010 may be connected to the relay terminal 1030 through a PC5 interface for sidelink, and the relay terminal 1030 may be connected to the base station 1050 through a Uu interface. In other words, the RLC layer, MAC layer, and PHY layer may be terminated at the link between the remote terminal 1010 and the relay terminal 1030, and at the link between the relay terminal 1030 and the base station 1050. The PC5-RLC layer 1014-3 of the remote terminal 1010 may be connected to the PC5-RLC layer 1034-3 of the relay terminal 1030. The PC5-MAC layer 1015-3 of the remote terminal 1010 may be connected to the PC5-MAC layer 1035-3 of the relay terminal 1030. The PC5-PHY layer 1016-3 of the remote terminal 1010 may be connected with the PC5-PHY layer 1036-3 of the relay terminal 1030. The Uu-RLC layer 1034-4 of the relay terminal 1030 may be connected with the Uu-RLC layer 1054-3 of the base station 1050. The Uu-MAC layer 1035-4 of the relay terminal 1030 may be connected with the Uu-MAC layer 1055-3 of the base station 1050. The Uu-PHY layer 1036-4 of the relay terminal 1030 may be connected to the Uu-PHY layer 1056-3 of the base station 1050. An N2 stack 1052-4 of the base station 1050 may be connected to an N2 stack 1072-3 of the core network 1070. The base station 1050 may be connected to an AMF, which is a control plane function of the core network 1070, through an N2 interface. A control signal may be transmitted and received between the remote terminal 1010 and the relay terminal 1030 based on an RLC channel 1020-3. A control signal may be transmitted and received between the relay terminal 1030 and the base station 1050 based on a Uu signaling RB (Uu-SRB) 1040-3. A control signal may be transmitted and received between the base station 1050 and the core network 1070 based on the N2 interface 1060-3.

Figure 11:
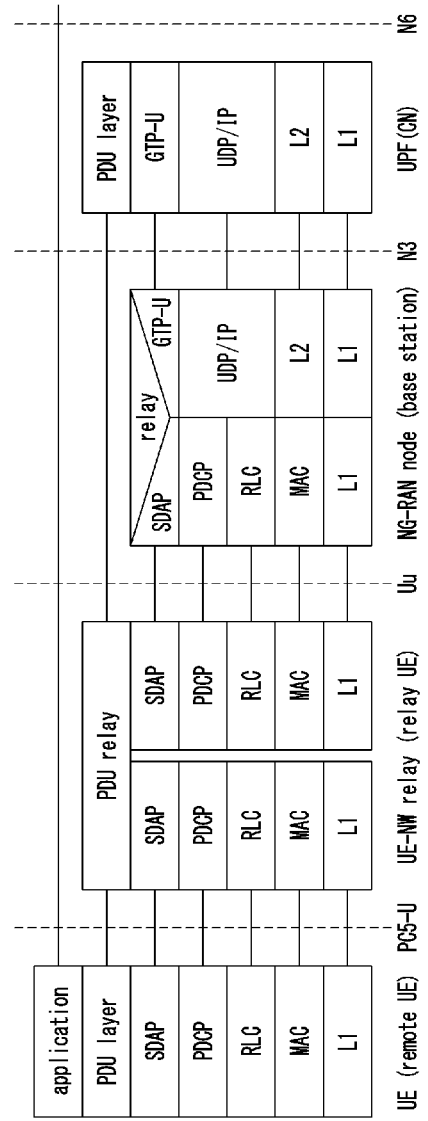
FIG. 11 is a conceptual diagram illustrating an exemplary embodiment of a layer 3 (L3) relay protocol structure in a communication system supporting a sidelink-based relay.

FIG. 11 is a conceptual diagram illustrating an exemplary embodiment of a layer 3 (L3) relay protocol structure in a communication system supporting a sidelink-based relay.

Referring to FIG. 11, a communication system may include a remote UE, a relay UE, a base station, and a CN. Hereinafter, in describing an exemplary embodiment of the L3 relay protocol structure in the communication system with reference to FIG. 11, descriptions overlapping those described with reference to FIGS. 1 to 10B may be omitted.

In an exemplary embodiment of the communication system, the remote UE may be referred to as 'UE'. The relay UE may correspond to a 'U2N relay UE' or 'UE-network (NW) relay'. The base station may correspond to a Next Generation-Radio Access Network (NG-RAN) node. The CN may include functions such as UPF. Here, the UPF may be the same as or similar to the UPF described with reference to FIG. 1. The L3 relay protocol structure may be formed identically or similarly to that of FIG. 11 between the remote UE, the relay UE (or UE-NW relay), the base station (or NG-RAN node), and the CN (or UPF). A connection between the remote UE and the relay UE may be configured as a PC5 interface (or PC5-U, etc.). A connection between the relay UE and the base station may be configured as a Uu interface.

Unlike the L2 relay protocol structure described with reference to FIG. 10, in the L3 relay protocol structure, all radio protocols for the remote UE may be terminated at the relay UE, and a separate radio protocol may be used between the relay UE and the base station (or network). A connection between the base station and the CN may be configured as an N3 interface. In the L3 protocol relay structure, mapping between bearers on the PC5 interface and the Uu interface may be performed in form of IP packets. Accordingly, unlike the L2 relay protocol structure, a separate adaptation layer may not be required in the L3 relay protocol structure.

Figure 12A:
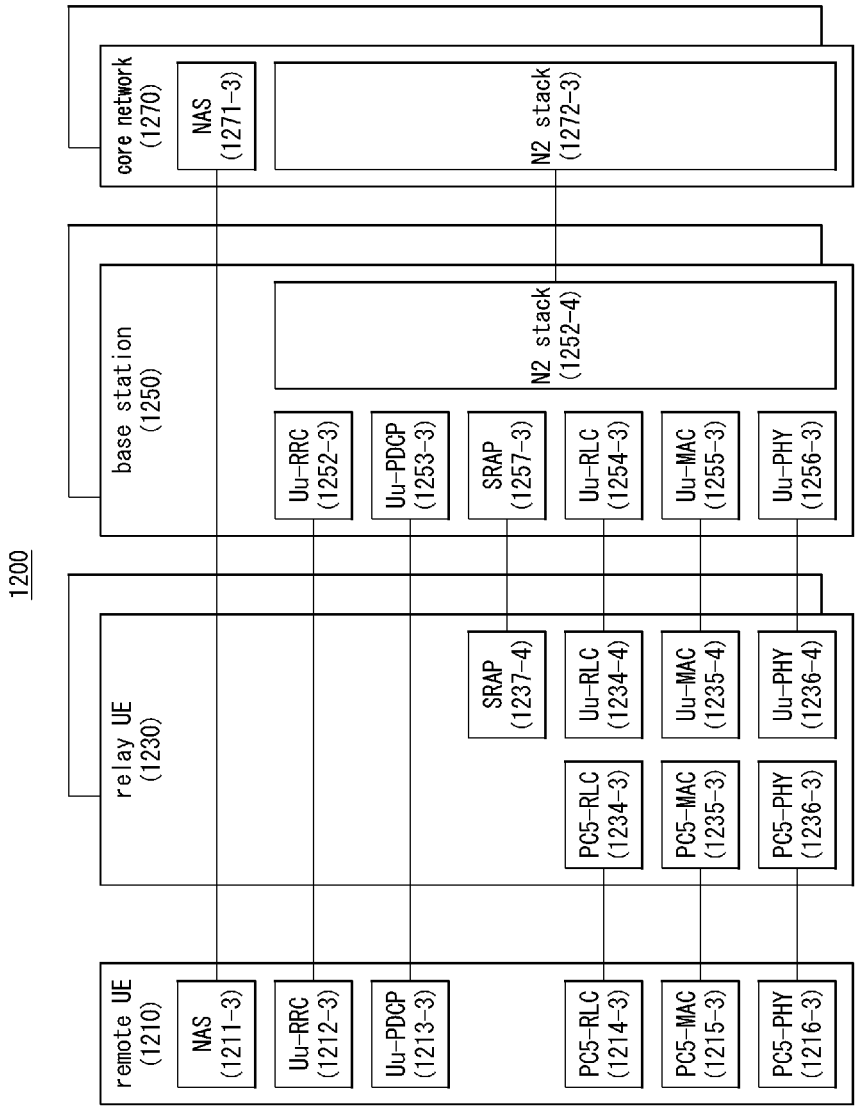
FIGS. 12A and 12B are conceptual diagrams for describing exemplary embodiments of a radio access protocol structure for each of a remote terminal and a relay terminal in a communication system.
Figure 12B:
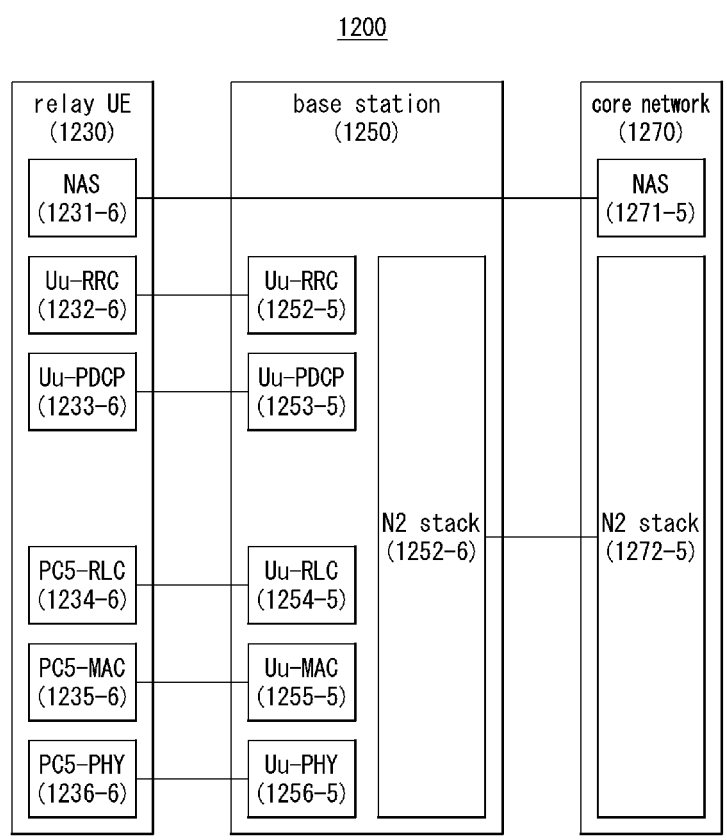

FIGS. 12A and 12B are conceptual diagrams for describing exemplary embodiments of a radio access protocol structure for each of a remote terminal and a relay terminal in a communication system.

Referring to FIGS. 12A and 12B, a communication system 1200 may include a remote UE 1210, a relay UE 1230, a base station 1250, and a core network (CN) 1270. In an exemplary embodiment of the communication system 1200, the L2 relay protocol structure may include both a control plane protocol for the remote UE 1210 to access the network and a control plane protocol for the relay UE 1230 to access the network. Hereinafter, in describing exemplary embodiments of the radio access protocol structure of each of the remote terminal and the relay terminal in the communication system with reference to FIGS. 12A and 12B, descriptions overlapping those described with reference to FIGS. 1 to 11 may be omitted.

Referring to FIG. 12A, in an exemplary embodiment of the communication system 1200, the L2 relay protocol structure may include a control plane protocol structure for the remote UE 1210 to access the network. The control plane protocol structure for the remote UE 1210 to access the network may be the same as or similar to the first exemplary embodiment of the control plane protocol structure for supporting relay functions in the communication system 1000 described with reference to FIG. 10B. The layers 1211-3, 1212-3, 1213-3, 1214-3, 1215-3, and 1216-3 of the remote UE 1210 may be the same as or similar to the layers 1011-3, 1012-3, 1013-3, 1014-3, 1015-3, and 1016-3 of the remote UE 1010 described with reference to FIG. 10B, respectively. The layers 1234-3, 1235-3, 1236-3, 1234-4, 1235-4, 1236-4, and 1237-4 of the relay UE 1230 may be the same as or similar to the layers 1034-3, 1035-3, 1036-3, 1034-4, 1035-4, 1036-4, and 1037-4 of the relay UE 1030 described with reference to FIG. 10B, respectively. The layers 1252-3, 1253-3, 1254-3, 1255-3, 1256-3, 1257-3, and 1252-4 of the base station 1250 may be the same as or similar to the layers 1052-3, 1053-3, 1054-3, 1055-3, 1056-3, 1057-3, and 1052-4 of the base station 1050 described with reference 10B, respectively. The layers 1271-3 and 1272-3 of the core network 1270 may be the same as or similar to the layers 1071-3 and 1072-3 of the core network 1070 described with reference to FIG. 10B, respectively.

In an exemplary embodiment of the communication system 1200, the adaptation layer 1237-4 of the relay UE 1230 may be specified as 'Sidelink Relay Adaptation Protocol (SRAP) layer'. The SRAP layer 1237-4 may be used for bearer mapping between a PC5 RLC channel and a Uu RLC channel.

As shown in FIG. 12A, in an exemplary embodiment of the communication system 1200, two control plane protocol structures may be formed for the relay UE 1230. One may be a control plane protocol structure for the remote UE 1210 to access the network, and the other may be a control plane protocol structure for the relay UE 1230 to access the network. The control plane protocol structure for the relay UE 1230 to access the network will be described in more detail with reference to FIG. 12B.

Referring to FIG. 12B, the control plane protocol structure for the relay UE 1230 to access the network may include a NAS layer, an RRC layer, a PDCP layer, an RLC layer, a MAC layer, a PHY layer, and the like. A NAS layer 1231-6 of the relay UE 1230 may be connected to a NAS layer 1271-6 of the core network 1270. A Uu-RRC layer 1232-6 of the relay UE 1230 may be connected to a Uu-RRC layer 1252-5 of the base station 1250. A Uu-PDCP layer 1233-6 of the relay UE 1230 may be connected to a Uu-PDCP layer 1253-5 of the base station 1250. A Uu-RLC layer 1234-6 of the relay UE 1230 may be connected to a Uu-RLC layer 1254-5 of the base station 1250. A Uu-MAC layer 1235-6 of the relay UE 1230 may be connected to a Uu-MAC layer 1255-5 of the base station 1250. A Uu-PHY layer 1236-6 of the relay UE 1230 may be connected to a Uu-PHY layer 1256-5 of the base station 1250. An N2 stack 1252-6 of the base station 1250 may be connected to an N2 stack 1272-5 of the core network 1270.

The Uu-RLC layer 1234-6, the Uu-MAC layer 1235-6, and the Uu-PHY layer 1236-6 of the relay UE 1230 shown in FIG. 12B may be the same as or different from the Uu-RLC layer 1234-4, the Uu-MAC layer 1235-4, and the Uu-PHY layer 1236-4 of the relay UE 1230 shown in FIG. 12A. The Uu-RRC layer 1252-5, the Uu-PDCP layer 1253-5, the Uu-RLC layer 1254-5, the Uu-MAC layer 1255-5, the Uu-PHY layer 1256-5, and the N2 stack 1252-6 of the base station 1250 shown in FIG. 12B may be the same as or different from the Uu-RRC layer 1252-3, the Uu-PDCP layer 1253-3, the Uu-RLC layer 1254-3, the Uu-MAC layer 1255-3, the Uu-PHY layer 1256-3, and the N2 stack 1252-4 of the base station 1250 shown in FIG. 12A. The NAS layer 1271-5 and the N2 stack 1272-5 of the core network 1270 shown in FIG. 12B may be the same as or different from the NAS layer 1271-3 and the N2 stack 1272-3 of the core network 1270 shown in FIG. 12A.

Unlike the control plane protocol structure for the remote UE 1210 to access the network shown in FIG. 12A, in the control plane protocol structure for the relay UE 1230 to access the network shown in FIG. 12B, a separate adaptation layer or a structure corresponding thereto may not be required.

In an exemplary embodiment of the communication system 1200, a core network area mobility management procedure (e.g., TAU) and a RAN area mobility management procedure (e.g., RANU) may be performed for the remote UE 1210 based on the NAS layer 1211-3 and the Uu-RRC layer 1212-3 of the remote UE 1210 shown in FIG. 12A. The relay UE 1230 may receive TAI information and/or RAI information from the base station 1250. The relay UE 1230 may transmit the TAI information and/or RAI information received from the base station 1250 to the remote UE 1210 as it is. According to this mobility management scheme, whenever a TA and/or RNA is changed as the relay UE 1230 moves, the remote UE 1210 may also need to share the changed information. When a plurality of remote UEs are connected to the relay UE 1230, excessive signaling overhead may occur.

Meanwhile, in another exemplary embodiment of the communication system 1200, a core network area mobility management procedure and a RAN area mobility management procedure may be performed for the remote UE 1210 based on the NAS layer 1231-6 and the Uu-RRC layer 1232-6 of the relay UE 1230 shown in FIG. 12B. The relay UE 1230 may receive TAI information and/or RAI information from the base station 1250. Instead of transmitting the TAI information and/or RAI information received from the base station 1250 to the remote UE 1210 as it is, the relay UE 1230 may transmit information of a preconfigured virtual TAI (V-TAI) and/or virtual RAI (V-RAI) to the remote UE 1210. Here, even when a TA and/or RNA are changed as the relay UE 1230 moves, the remote UE 1210 may perform communication based on previously received v-TAI and/or v-RAI. That is, the remote UE 1210 may perform a TAU procedure and/or RNAU procedure when initially connected to the relay UE 1230, but thereafter, even when the relay UE 1230 performs a TAU procedure and/or RNAU procedure, the remote UE 1210 may not perform a TAU procedure and/or RNAU procedure. In other words, a part of the functions of the NAS layer 1231-6 and the Uu-RRC layer 1232-6 of the remote UE 1210 may be performed by the NAS layer 1231-6 and the Uu-RRC layer 1232-6 of the relay UE 1220.

FIG. 13 is a sequence chart for describing an exemplary embodiment of a mobility management procedure for a remote terminal in an idle state in a communication system.

Referring to FIG. 13, a communication system 1300 may include a core network (CN), one or more base stations, and one or more UEs. Hereinafter, in describing an exemplary embodiment of the mobility management procedure for a remote terminal in the idle state with reference to FIG. 13, descriptions overlapping those described with reference to FIGS. 1 to 12 may be omitted.

The communication system 1300 may include a remote UE 1301, a relay UE 1303, a first base station 1305, a CN 1307, and the like. The remote UE 1301 may be connected to the first base station 1305 through relaying of the relay UE 1303. Communication between the remote UE 1301, the relay UE 1303, the first base station 1305, and the CN 1307 may be performed based on the protocol structure shown in FIG. 12A or 12B.

In an exemplary embodiment of the communication system 1300, the remote UE 1301 may be connected to the first base station 1305 through the relay UE 1303. The relay UE 1303 may receive system information from the first base station 1305 (S1310). The system information received by the relay UE 1303 in step S1310 may be SIB(s), for example. The system information received by the relay UE 1303 may include a first identifier and/or a second identifier. Here, the first identifier may be a TAI corresponding to the current relay UE 1303 or the first base station 1305. The second identifier may be an RAI corresponding to the current relay UE 1303 or the first base station 1305.

The relay UE 1303 may generate a first virtual area identifier and/or a second virtual area identifier that is distinguished from the first identifier and/or the second identifier received in step S1310. Here, the first virtual area identifier may be a V-TAI. The second virtual region identifier may be a V-RAI. The relay UE 1303 may transmit the generated first virtual area identifier and/or second virtual area identifier to the remote UE 1301 (S1315). The remote UE 1301 may receive the first virtual area identifier and/or the second virtual area identifier transmitted from the relay UE 1303 (S1315).

The remote UE 1301 may determine whether an area update procedure is required based on the first virtual area identifier and/or the second virtual area identifier received in step S1315. For example, the remote UE 1301 in the idle state may trigger a TAU procedure when the first virtual area identifier (i.e., V-TAI) that it receives is different from the previous TAI received from the network (S1320).

The remote UE 1301 may transmit a TAU request message to the relay UE 1303 (S1330). The relay UE 1303 may receive the TAU request message transmitted from the remote UE 1303 (S1330). The relay UE 1303 may transmit the TAU request message received in step S1330 to the first base station 1305 (S1335). The first base station 1305 may receive the TAU request message transmitted from the relay UE 1303 (S1335). The first base station 1305 may transmit the TAU request message received in step S1335 to the CN 1307 (S1340). The CN 1307 may receive the TAU request message transmitted from the first base station 1305 (S1340). The TAU request message transmitted and received in steps S1330 to S1340 may be the same as or different from the TAU request message described with reference to FIG. 5. The TAU request message transmitted and received in steps S1335 and S1340 may include one or more temporary identifiers previously assigned to one or more UEs relayed by the relay UE 503, including the remote UE 501. In other words, the TAU request message may include a list of UE-IDs.

The CN 1307 may transmit a TAU accept message, which is a response to the TAU request message received in step S1340, to the first base station 1305 (S1345). The first base station 1305 may receive the TAU accept message transmitted from the CN 1307 (S1345). The first base station 1305 may transmit the TAU accept message received in step S1345 to the relay UE 1303 (S1350). The relay UE 1303 may receive the TAU accept message transmitted from the first base station 1305 (S1350). The relay UE 1303 may transmit the TAU accept message received in step S1350 to the remote UE 1301 (S1355). The remote UE 1301 may receive the TAU accept message transmitted from the relay UE 1303 (S1355). The TAU accept message transmitted and received in steps S1345 to S1355 may be the same as or different from the TAU accept message described with reference to FIG. 5. For example, the TAU accept message may include information on a third identifier determined through TA reassignment performed by the CN 1307 based on the TAU request message. The third identifier may correspond to a temporary identifier used for paging.

The remote UE 1301 may transmit a TAU complete message, which is a response to the TAU accept message received in step S1355, to the relay UE 1303 (S1360). The relay UE 1303 may receive the TAU complete message transmitted from the remote UE 1303 (S1360). The relay UE 1303 may transmit the TAU complete message received in step S1360 to the first base station 1305 (S1365). The first base station 1305 may receive the TAU complete message transmitted from the relay UE 1303 (S1365). The first base station 1305 may transmit the TAU complete message received in step S1365 to the CN 1307 (S1370). The CN 1307 may receive the TAU complete message transmitted from the first base station 1305 (S1370). The TAU complete message transmitted and received in steps S1360 to S1370 may be the same as or different from the TAU complete message described with reference to FIG. 5. The signaling operations of the TAU complete message according to steps S1360 to S1370 may be omitted.

The remote UE 1301 may transmit information on the third identifier included in the TAU accept message to the relay UE 1303 (S1380). The relay UE 1303 may receive the information on the third identifier transmitted from the remote UE 1301 (S1380). The relay UE 1303 may store the information of the third identifier received in step S1380 (S1385). When a paging procedure related to the remote UE 1301 is performed, the relay UE 1303 may refer to the information of the third identifier stored in step S1385.

If the relay UE 1303 can directly decode the message (e.g., TAU accept message) received in step S1350, the relay UE 1303 may directly obtain the third identifier included in the message received in step S1350, and may store the obtained third identifier (S1385). In this case, the signaling procedure according to step S1380 may not be required.

Meanwhile, the message received by the relay UE 1303 in step S1350 may be a message to be transmitted to the remote UE 1301, and may be encrypted so that the relay UE 1303 cannot decrypt it. In this case, the relay UE 1303 may obtain the third identifier through step S1380, and store the obtained third identifier (S1385).

Meanwhile, the remote UE 1301 may repeatedly trigger a TAU procedure based on a preconfigured cycle timer. For example, the remote UE 1301 may trigger a TAU procedure based on a preset first cycle timer (S1320). In this case, the remote UE 1301, the relay UE 1303, the first base station 1305, and the CN 1307 may perform at least some of the operations in steps S1330 to S1385. The relay UE 1303 may store the information of the third identifier received in step S1380 (S1385). In this regard, the relay UE 1303 may delete the previously stored temporary identifier for the remote UE 1301 based on a preset second cycle timer. Here, the first cycle timer and the second cycle timer may be set to have the same or similar cycles. Alternatively, a cycle according to the second cycle timer may be set shorter than a cycle according to the first cycle timer.

An operation in which a UE (remote UE, etc.) in the idle state (RRC IDLE state, etc.) changes a cell through a cell reselection procedure may be performed autonomously without a signaling operation with the CN or base station. In this case, a mobile relay or network may not be aware of whether the UE has changed a cell. In this regard, the remote UE 1301 may trigger a TAU procedure based on a preset cycle timer. The relay UE 1303, the first base station 1305, the CN 1307, and the like may perform signaling operations according to the TAU procedure triggered by the remote UE 1301 based on the cycle timer, thereby periodically updating or reconfiguring the temporary identifier for the first UE 1301.

FIG. 14 is a sequence chart for describing an exemplary embodiment of a mobility management procedure for a remote terminal in an inactive state in a communication system.

Referring to FIG. 14, a communication system 1400 may include a core network (CN), one or more base stations, and one or more UEs. Hereinafter, in describing an exemplary embodiment of the mobility management procedure for a remote terminal in the inactive state with reference to FIG. 14, descriptions overlapping those described with reference to FIGS. 1 to 13 may be omitted.

The communication system 1400 may include a remote UE 1401, a relay UE 1403, a first base station 1405, a second base station 1406, a CN (not shown), and the like. The remote UE 1401 may be connected to the first base station 1405 through relaying of the relay UE 1403. The second base station 1406 may be a base station to which the remote UE 1401 or remote UE 1304 was previously connected.

In an exemplary embodiment of the communication system 1400, the remote UE 1401 may be connected to the first base station 1405 through the relay UE 1403. The relay UE 1403 may receive system information from the first base station 1405 (S1410). The system information received by the relay UE 1403 in step S1410 may be SIB(s), for example. The system information received by the relay UE 1403 may include a first identifier and/or a second identifier. Here, the first identifier may be a TAI corresponding to the current relay UE 1403 or the first base station 1405. The second identifier may be an RAI corresponding to the current relay UE 1403 or the first base station 1405.

The relay UE 1403 may generate a first virtual area identifier and/or a second virtual area identifier that is distinguished from the first identifier and/or second identifier received in step S1410. Here, the first virtual area identifier may be a V-TAI. The second virtual region identifier may be a V-RAI. The relay UE 1403 may transmit the generated first virtual area identifier and/or the second virtual area identifier to the remote UE 1401 (S1415). The remote UE 1401 may receive the first virtual area identifier and/or the second virtual area identifier transmitted from the relay UE 1403 (S1415).

The remote UE 1401 may determine whether an area update procedure is required based on the first virtual area identifier and/or the second virtual area identifier received in step S1415. For example, the remote UE 1401 in the inactive state may trigger an RNAU procedure when the first virtual area identifier (i.e., V-RAI) that it receives is different from a previous RAI received from the network (S1420).

The remote UE 1401 may transmit an RRC resume request message to the relay UE 1403 (S1430). The relay UE 1403 may receive the RRC resume request message transmitted from the remote UE 1403 (S1430). The relay UE 1403 may transmit the RRC resume request message received in step S1430 to the first base station 1405 (S1435). The first base station 1405 may receive the RRC resume request message transmitted from the relay UE 1403 (S1435). The RRC resume request message transmitted and received in steps S1430 and S1435 may be the same as or different from the RRC resume request message described with reference to FIG. 6. The RRC resume request message transmitted and received in steps S1430 and S1435 may be defined to include information identical to or similar to that shown in Table 1.

Based on the RRC resume request message received in step S1435, the first base station 1405 may transmit a UE context recovery request message to the second base station 1406 (S1440). The second base station 1406 may receive the UE context recovery request message transmitted from the first base station 1405 (S1440). The second base station 1406 may transmit a UE context recovery response message, which is a response to the UE context recovery request message received in step S1440, to the first base station 1405 (S1445). The first base station 1405 may receive the UE context recovery response message transmitted from the second base station 1406 (S1445). The UE context recovery request message and the UE context recovery response message transmitted and received in steps S1440 and S1445 may be the same as or different from the UE context recovery request message and the UE context recovery response message described with reference to FIG. 6.

Based on the UE context recovery response message received in step S1445, the first base station 1405 may transmit an RRC release message to the relay UE 1403 (S1450). The relay UE 1403 may receive the RRC release message transmitted from the first base station 1405 (S1450). The relay UE 1403 may transmit the RRC release message received in step S1450 to the remote UE 1401 (S1455). The remote UE 1401 may receive the RRC release message transmitted from the relay UE 1403 (S1455). The RRC release message transmitted and received in steps S1450 and S1455 may be the same as or different from the RRC release message described with reference to FIG. 6. For example, the RRC release message may receive information of a third identifier newly assigned to the remote UE 1401 based on the RNAU procedure. The third identifier may correspond to a temporary identifier used for paging.

Meanwhile, based on the UE context recovery response message received by the first base station 1405 in step S1445, a path switching procedure may be performed (S1460). For example, the base station 1405 may transmit a path switching request message to the CN (not shown) based on the UE context recovery response message received in step S1445. The CN (not shown) may receive the path switching request message transmitted from the first base station 1405. The CN (not shown) may transmit a response signal or feedback signal for the path switching request message received from the first base station 1405 to the first base station 1405. Meanwhile, the first base station 1405 may transmit a message requesting or indicating release of the UE context for the first UE 1401 to the second base station 1406 (S1470). The second base station 1406 may receive the message transmitted from the first base station 1405 (S1470). The operations according to steps S1460 and S1470 may be the same as or similar to the operations according to steps S660 to S670 described with reference to FIG. 6. The signaling operations according to steps S1460 and S1470 and operations corresponding thereto may be omitted.

The remote UE 1401 may transmit information on the third identifier included in the RRC release message to the relay UE 1403 (S1480). The relay UE 1403 may receive the information on the third identifier transmitted from the remote UE 1401 (S1480). The relay UE 1403 may store the information of the third identifier received in step S1480 (S1485). When a paging procedure related to the remote UE 1401 is performed, the relay UE 1403 may refer to the information of the third identifier stored in step S1485.

If the relay UE 1403 can directly decode the message received in step S1450 (e.g., RRC release message), the relay UE 1403 may directly obtain the third identifier included in the message received in step S1450. and may store the obtained third identifier (S1485). In this case, the signaling procedure according to step S1480 may not be required.

Meanwhile, the message received by the relay UE 1403 in step S1450 may be a message to be transmitted to the remote UE 1401, and may be encrypted so that the relay UE 1403 cannot decrypt it. In this case, the relay UE 1403 may obtain the third identifier through step S1480, and store the obtained third identifier (S1485).

Meanwhile, the remote UE 1401 may repeatedly trigger an RNAU procedure based on a preset cycle timer. For example, the remote UE 1401 may trigger an RNAU procedure based on a preset first cycle timer (S1420). In this case, the remote UE 1401, relay UE 1403, first base station 1405, second base station (not shown), CN 1407, and the like may perform at least some of the operations according to steps S1430 to S1485. The relay UE 1403 may store the information of the third identifier received in step S1480 (S1485). In this regard, the relay UE 1403 may delete the previously stored temporary identifier for the remote UE 1401 based on a preset second cycle timer. Here, the first cycle timer and the second cycle timer may be set to have the same or similar cycles. Alternatively, the cycle according to the second period timer may be set shorter than the cycle according to the first period timer.

An operation in which a UE (remote UE, etc.) in the inactive state (RRC_INACTIVE state, etc.) changes a cell through a cell reselection procedure may be performed autonomously without a signaling operation with the CN or the base station. In this case, the mobile relay or network may not be aware of whether the UE has changed a cell. In this regard, the remote UE 1401 may trigger the RNAU procedure based on the preset cycle timer. The relay UE 1403, the first base station 1405, the second base station (not shown), the CN 1407, and the like may perform signaling operations according to the RNAU procedure triggered by the remote UE 1401 based on the cycle timer, thereby periodically updating or reconfiguring the temporary identifier for the first UE 1401.

Figure 15:
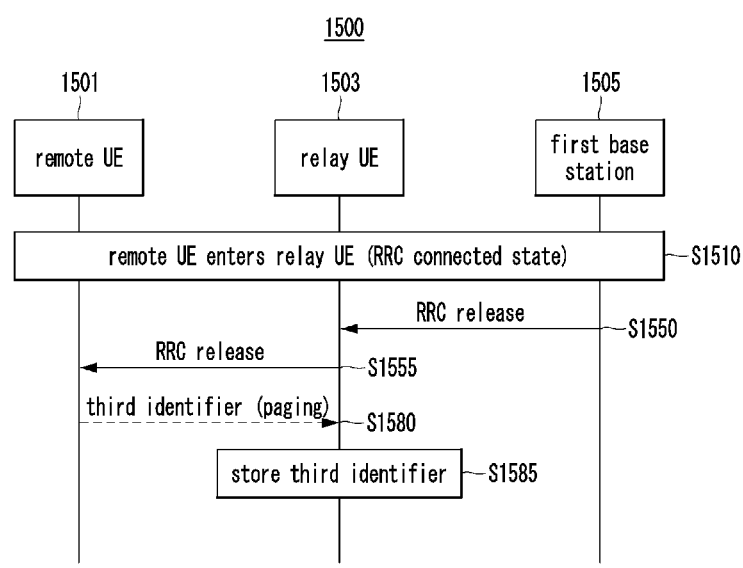
FIG. 15 is a sequence chart for describing an exemplary embodiment of a mobility management procedure for a remote terminal in a connected state in a communication system.

FIG. 15 is a sequence chart for describing an exemplary embodiment of a mobility management procedure for a remote terminal in a connected state in a communication system.

Referring to FIG. 15, a communication system 1500 may include a core network (CN), one or more base stations, and one or more UEs. Hereinafter, in describing an exemplary embodiment of the mobility management procedure for a remote terminal in the connected state with reference to FIG. 15, descriptions overlapping those described with reference to FIGS. 1 to 14 may be omitted.

The communication system 1500 may include a remote UE 1501, a relay UE 1503, a first base station 1505, a CN (not shown), and the like. Communication between the remote UE 1501, the relay UE 1503, the first base station 1505, and the CN (not shown) may be performed based on the protocol structure shown in FIG. 12A or 12B.

In an exemplary embodiment of the communication system 1500, the remote UE 1501 may enter the relay UE 1503 (S1510). The relay UE 1503 may be in the RRC connected state with the first base station 1505. The remote UE 1501 entering the relay UE 1503 may be in the RRC connected state with the first base station 1505. For the remote UE 1501 in the RRC connected state, a UE temporary identifier for the RRC inactive state (RRC_INACTIVE state) may not be assigned or configured.

When the RRC connection with the remote UE 1501 is released, the first base station 1505 may transmit an RRC release message to the relay UE 1503 (S1550). The relay UE 1503 may receive the RRC release message transmitted from the first base station 1505 (S1550). The relay UE 1503 may transmit the RRC release message received in step S1550 to the remote UE 1501 (S1555). The remote UE 1501 may receive the RRC release message transmitted from the relay UE 1503 (S1555). The RRC release message transmitted and received in steps S1550 and S1555 may be the same as or different from the RRC release message described with reference to FIG. 6. For example, the RRC release message may include information on a third identifier newly assigned to the remote UE 1501 as the RRC connection with the remote UE 1501 is released from the first base station 1505. The third identifier may correspond to a temporary identifier used for paging.

The remote UE 1501 may transmit information on the third identifier included in the RRC release message to the relay UE 1503 (S1580). The relay UE 1503 may receive information on the third identifier transmitted from the remote UE 1501 (S1580). The relay UE 1503 may store the information of the third identifier received in step S1580 (S1585). When a paging procedure related to the remote UE 1501 is performed, the relay UE 1503 may refer to the information on the third identifier stored in step S1585.

Figure 16:
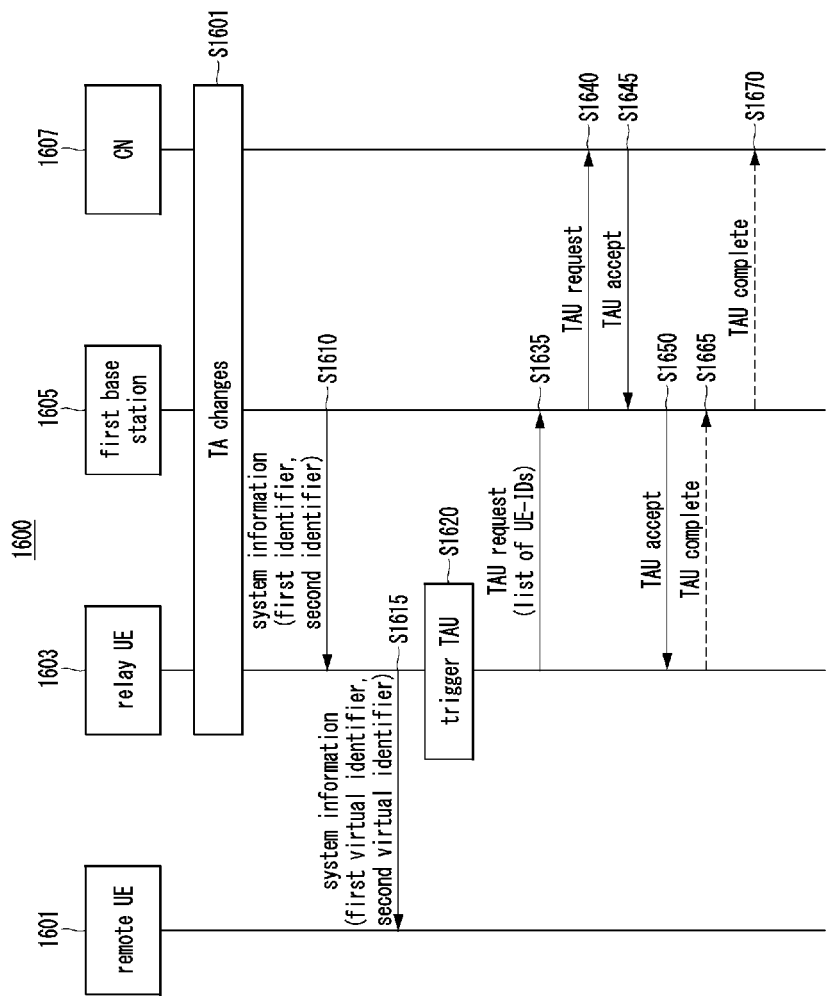
FIG. 16 is a sequence chart for describing a first exemplary embodiment of a relay UE-based mobility management procedure in a communication system.

FIG. 16 is a sequence chart for describing a first exemplary embodiment of a relay UE-based mobility management procedure in a communication system.

Referring to FIG. 16, a communication system 1600 may include a core network (CN), one or more base stations, and one or more UEs. Hereinafter, in describing the first exemplary embodiment of the relay UE-based mobility management procedure with reference to FIG. 16, descriptions overlapping those described with reference to FIGS. 1 to 15 may be omitted.

The communication system 1600 may include a remote UE 1601, a relay UE 1603, a first base station 1605, a second base station (not shown), a CN 1607, and the like. The relay UE 1603 may be connected to the second base station (not shown). The remote UE 1601 may be connected to the second base station (not shown) through relaying of the relay UE 1603. The remote UE 1601 and the relay UE 1603 may perform operations according to one or more of the exemplary embodiments of the mobility management procedure shown in FIGS. 13 to 15 together with the second base station (not shown). For example, the relay UE 1603 may generate a first virtual area identifier and/or a second virtual area identifier for the remote UE 1601. Here, the first virtual area identifier may be a V-TAI. The second virtual region identifier may be a V-RAI. The relay UE 1603 may transmit the generated first virtual area identifier and/or second virtual area identifier to the remote UE 1601. The remote UE 1601 may receive the first virtual area identifier and/or the second virtual area identifier transmitted by the relay UE 1603.

The relay UE 1603 may move to the first base station 1605 having a TA different from that of the second base station (not shown) (S1601). Accordingly, the relay UE 1603 may belong to a TA different from the existing one. The relay UE 1603 may receive system information from the first base station 1605 (S1610). The system information received by the relay UE 1603 in step S1610 may be SIB(s), for example. The system information received by the relay UE 1603 may include a first identifier and/or a second identifier. Here, the first identifier may be a TAI corresponding to the current relay UE 1603 or the first base station 1605. The second identifier may be an RAI corresponding to the current relay UE 1603 or the first base station 1605.

The relay UE 1603 may transmit, to the remote UE 1601, a first virtual area identifier and/or a second virtual area identifier different from the first and/or second identifier received in step S1610 (S1615). The remote UE 1601 may receive the first virtual area identifier and/or the second virtual area identifier transmitted from the relay UE 1603 (S1615). The first virtual area identifier and/or the second virtual area identifier transmitted and received in step S1615 may be the same as the first virtual area identifier and/or the second virtual area identifier transmitted from the relay UE 1603 to the remote UE 1601 prior to the TA movement in step S1601. That is, the remote UE 1601 may not be aware of the TA movement in step S1601.

The relay UE 1603 may determine whether an area update procedure is required instead of the remote UE 1601 not aware of the TA movement. For example, the relay UE 1601 may trigger a TAU procedure when the first identifier received from the first base station is different from the previously TAI received from the network (S1620).

The relay UE 1603 may transmit a TAU request message to the first base station 1605 (S1635). The first base station 1605 may receive the TAU request message transmitted from the relay UE 1603 (S1635). The first base station 1605 may transmit the TAU request message received in step S1635 to the CN 1607 (S1640). The CN 1607 may receive the TAU request message transmitted from the first base station 1605 (S1640). The TAU request message transmitted and received in steps S1635 and S1640 may be the same as or similar to the TAU request message described with reference to FIG. 13. The TAU request message may include one or more temporary identifiers previously assigned to one or more UEs relayed by the relay UE 1303, including the remote UE 1301. In other words, the TAU request message may include a list of UE-IDs.

The CN 1607 may transmit a TAU accept message, which is a response to the TAU request message received in step S1640, to the first base station 1605 (S1645). The first base station 1605 may receive the TAU accept message transmitted from the CN 1607 (S1645). The first base station 1605 may transmit the TAU accept message received in step S1645 to the relay UE 1603 (S1650). The relay UE 1603 may receive the TAU accept message transmitted from the first base station 1605 (S1650). The TAU accept message transmitted and received in steps S1645 and S1650 may be the same as or similar to the TAU accept message described with reference to FIG. 13. For example, the TAU accept message may include information on a third identifier determined through TA reassignment performed by the CN 1607 based on the TAU request message. The third identifier may correspond to a temporary identifier used for paging.

The relay UE 1603 may transmit a TAU complete message as a response to the TAU accept message received in step S1650 to the first base station 1605 (S1665). The first base station 1605 may receive the TAU complete message transmitted from the relay UE 1603 (S1665). The base station 1605 may transmit the TAU complete message received in step S1665 to the CN 1607 (S1670). The CN 1607 may receive the TAU complete message transmitted from the first base station 1605 (S1670). The TAU complete message transmitted and received in steps S1665 and S1670 may be the same as or different from the TAU complete message described with reference to FIG. 13. The signaling operations of the TAU complete message according to steps S1665 and S1670 may be omitted.

The relay UE 1603 may store the information on the third identifier included in the TAU accept message received in step S1650. When a paging procedure related to the remote UE 1601 is performed, the relay UE 1603 may refer to the stored information on the third identifier.

Figure 17:
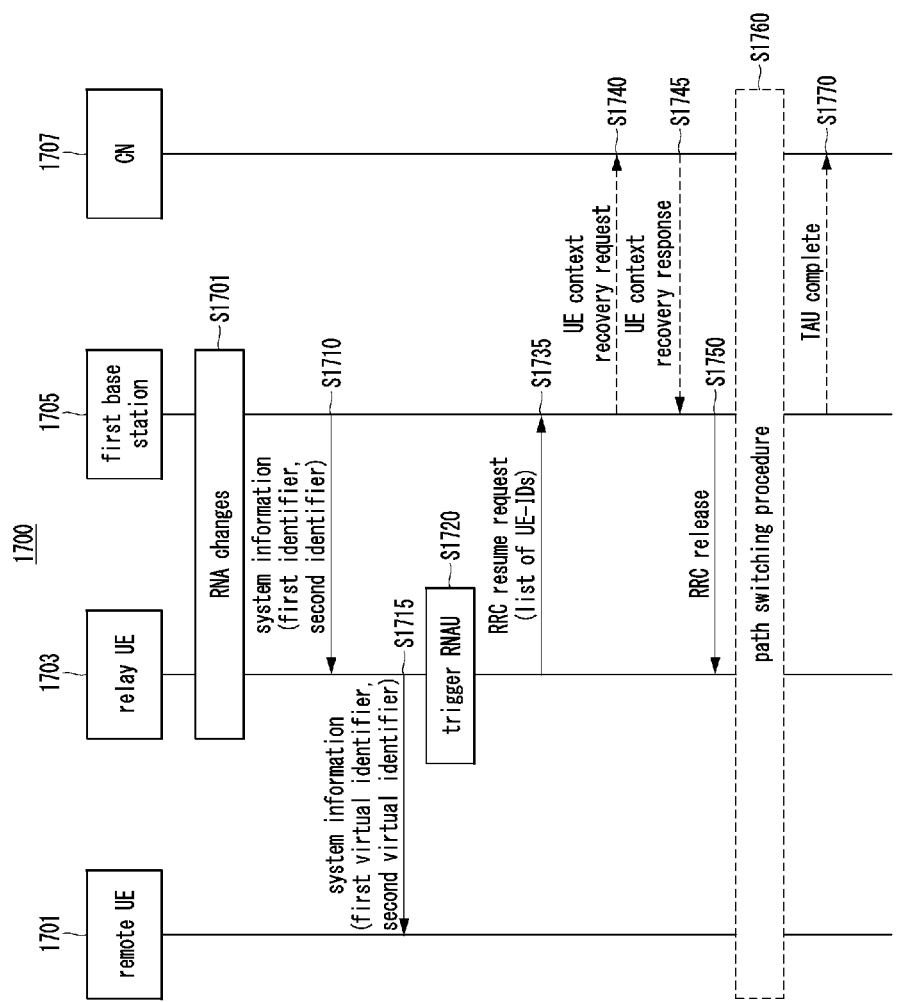
FIG. 17 is a sequence chart illustrating a second exemplary embodiment of a relay UE-based mobility management procedure in a communication system.

FIG. 17 is a sequence chart illustrating a second exemplary embodiment of a relay UE-based mobility management procedure in a communication system.

Referring to FIG. 17, a communication system 1700 may include a core network (CN), one or more base stations, and one or more UEs. Hereinafter, in describing the second exemplary embodiment of the relay UE-based mobility management procedure with reference to FIG. 17, descriptions overlapping those described with reference to FIGS. 1 to 16 may be omitted.

The communication system 1700 may include a remote UE 1701, a relay UE 1703, a first base station 1705, a second base station (not shown), a CN 1707, and the like. The relay UE 1703 may be connected to the second base station (not shown). The remote UE 1701 may be connected to the second base station (not shown) through relaying of the relay UE 1703. The remote UE 1701 and the relay UE 1703 may perform operations according to one or more of the exemplary embodiments of the mobility management procedure shown in FIGS. 13 to 15 together with the second base station (not shown).

The relay UE 1703 may move to the first base station 1705 having an RNA different from that of the second base station (not shown) (S1701). Accordingly, the relay UE 1703 may belong to an RNA different from the existing one. The relay UE 1703 may receive system information from the first base station 1705 (S1710). The system information received by the relay UE 1703 in step S1710 may be SIB(s), for example. The system information received by the relay UE 1703 may include a first identifier and/or a second identifier. Here, the first identifier may be a TAI corresponding to the current relay UE 1703 or the first base station 1705. The second identifier may be an RAI corresponding to the current relay UE 1703 or the first base station 1705.

The relay UE 1703 may transmit, to the remote UE 1701, a first virtual area identifier and/or a second virtual area identifier different from the first and/or second identifier received in step S1710 (S1715). The remote UE 1701 may receive the first virtual area identifier and/or the second virtual area identifier transmitted from the relay UE 1703 (S1715). The first virtual area identifier and/or the second virtual area identifier transmitted and received in step S1715 may be the same as the first virtual area identifier and/or the second virtual area identifier transmitted from the relay UE 1703 to the remote UE 1701 prior to the RNA movement in step S1701. That is, the remote UE 1701 may not be aware of the RNA movement in step S1701.

The relay UE 1703 may determine whether an area update procedure is required instead of the remote UE 1701 not aware of the RNA movement. For example, the relay UE 1701 may trigger an RNAU procedure when the second identifier received from the first base station is different from the previous RAI received from the network (S1720).

The relay UE 1703 may transmit an RRC resume request message to the first base station 1705 (S1735). The first base station 1705 may receive the RRC resume request message transmitted from the relay UE 1703 (S1735). The RRC resume request message transmitted and received in step S1735 may be the same as or similar to the RRC resume request message described with reference to FIG. 14. The RRC resume request message transmitted and received in step S1735 may be defined to include information identical to or similar to that shown in Table 2.

TABLE 2

```
RRCResumeRequest1 ::=              SEQUENCE {
    rrcResumeRequest1              RRCResumeRequest1-IEs
}
RRCResumeRequest1 -IEs ::=         SEQUENCE {
    resumeIdentityList             SEQUENCE
(SIZE(1..maxNrofResumeId)) OF I-RNTI-Value,
    resumeMAC-I                    BIT STRING (SIZE (16)),
    resumeCause                    ResumeCause,
    spare                          BIT STRING (SIZE (1))
}
```

Referring to Table 2, the RRC resume request message may include one or more temporary identifiers assigned by the base station to one or more UEs in the inactive state. For example, the RRC resume request message may include one or more I-RNTIs assigned to one or more UEs relayed by the relay UE 1703, including the remote UE 1701, from the second base station 1706 (i.e., "SEQUENCE (SIZE(1 . . . maxNrofResumeId)) OF I-RNTI-Value"). In other words, the RRC resume request message may include a list of UE-IDs.

Based on the RRC resume request message received in step S1735, the first base station 1705 may transmit a UE context recovery request message to the second base station 1706 (S1740). The second base station 1706 may receive the UE context recovery request message transmitted from the first base station 1705 (S1740). The second base station 1706 may transmit a UE context recovery response message, which is a response to the UE context recovery request message received in step S1740, to the first base station 1705 (S1745). The first base station 1705 may receive the UE context recovery response message transmitted from the second base station 1706 (S1745). The UE context recovery request message and the UE context recovery response message transmitted and received in steps S1740 and S1745 may be the same as or different from the UE context recovery request message and the UE context recovery response message described with reference to FIG. 14.

Based on the UE context recovery response message received in step S1745, the first base station 1705 may transmit an RRC release message to the relay UE 1703 (S1750). The relay UE 1703 may receive the RRC release message transmitted from the first base station 1705 (S1750). The relay UE 1703 may transmit the RRC release message received in step S1750 to the remote UE 1701 (S1755). The remote UE 1701 may receive the RRC release message transmitted from the relay UE 1703 (S1755). The RRC release message transmitted and received in steps S1750 and S1755 may be the same as or different from the RRC release message described with reference to FIG. 14. For example, the RRC release message may include information of a third identifier newly assigned to the remote UE 1701 based on the RNAU procedure. The third identifier may correspond to a temporary identifier used for paging.

Meanwhile, based on the UE context recovery response message received by the first base station 1705 in step S1745, a path switching procedure may be performed (S1760). For example, the base station 1705 may transmit a path switching request message to the CN (not shown) based on the UE context recovery response message received in step S1745. The CN (not shown) may receive the path switching request message transmitted from the first base station 1705. The CN (not shown) may transmit a response signal or a feedback signal for the path switching request message received from the first base station 1705 to the first base station 1705. Meanwhile, the first base station 1705 may transmit a message requesting or indicating release of the UE context for the first UE 1701 to the second base station 1706 (S1770). The second base station 1706 may receive the message transmitted from the first base station 1705 (S1770). The operations according to steps S1760 and S1770 may be the same as or similar to the operations according to steps S1460 and S1470 described with reference to FIG. 14. The signaling operations according to steps S1760 and S1770 and operations corresponding thereto may be omitted.

The relay UE 1703 may store information on the third identifier included in the RRC release message received in step S1750. When a paging procedure related to the remote UE 1701 is performed, the relay UE 1703 may refer to the stored information on the third identifier.

FIG. 18 is a conceptual diagram for describing a first exemplary embodiment of a mobile identity (IE) information element in a communication system.

Referring to FIG. 18, a mobile identity information element (IE) may indicate a temporary identifier for a terminal in a communication system. Hereinafter, in describing the first exemplary embodiment of the mobile identity IE with reference to FIG. 18, descriptions overlapping those described with reference to FIGS. 1 to 17 may be omitted.

The mobile identity IE may consist of a plurality of octets (e.g., octets 1 to 10). The size of each of the plurality of octets may be 8 bits. The plurality of octets may include information on a mobile identity IE identifier (IEI), length of the mobile identity content, type of identity, AMF set ID, AMF pointer, temporary identifier, and the like. Here, the temporary identifier may be the S-TMSI described with reference to FIG. 5, but this is only an example for convenience of description, and the first exemplary embodiment of the mobile identity IE in the communication system is not limited thereto. The temporary identifier may be indicated through 4 octets. The first exemplary embodiment of the mobile identity IE may indicate one temporary identifier for one UE through 4 octets.

Figure 19:
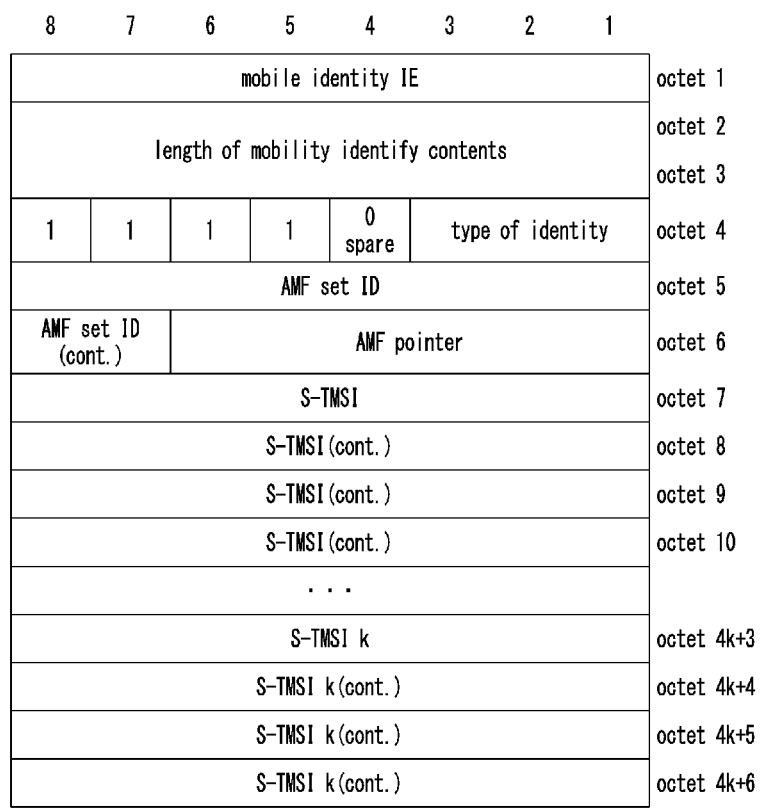
FIG. 19 is a conceptual diagram for describing a second exemplary embodiment of a mobile identify IE in a communication system.

FIG. 19 is a conceptual diagram for describing a second exemplary embodiment of a mobile identify IE in a communication system.

Referring to FIG. 19, a mobile identity IE may indicate a temporary identifier for a terminal in a communication system. Hereinafter, in describing the second exemplary embodiment of the mobile identity IE with reference to FIG. 19, descriptions overlapping those described with reference to FIGS. 1 to 18 may be omitted.

The mobile identity IE may consist of multiple octets (e.g., octet 1 to (4 k+6)). The second exemplary embodiment of the mobile identity IE may indicate information on one or more temporary identifiers for one or more UEs through a plurality of octets. For example, the second exemplary embodiment of the mobile identity IE may indicate information on one or more temporary identifiers for k UEs through 4 k octets. Here, k may be a natural number greater than or equal to 1. For example, when k is 1, the second exemplary embodiment of the mobile identity IE may be configured identically or similarly to the first exemplary embodiment of the mobile identity IE described with reference to FIG. 18. Meanwhile, when k is greater than 1, the second exemplary embodiment of the mobile identity IE may differ from the first exemplary embodiment of the mobile identity IE described with reference to FIG. 18, and may indicate information on a plurality of temporary identifiers for a plurality of UEs. At least part of the TAU request message described with reference to FIG. 5 and the TAU request message described with reference to FIG. 13 may include one temporary identifier for one UE indicated by the first exemplary embodiment of the mobile identity IE described with reference to FIG. 18. At least part of the TAU request messages described with reference to FIG. 16 may include a list of one or more temporary identifiers (or UE-ID list) for one or more UEs indicated by the second exemplary embodiment of the mobile identity IE described with reference to FIG. 19. For example, the TAU request message transmitted and received in step S1330 shown in FIG. 13 may include one temporary identifier for one UE indicated by the first exemplary embodiment of the mobile identity IE described with reference to FIG. 18. Meanwhile, for example, the TAU request message transmitted and received in at least some of steps S1335 and S1340 shown in FIG. 13 and step S1635 shown in FIG. 16 may include one or more temporary identifiers for one or more UEs indicated by the second exemplary embodiment of the mobile identity IE described with reference to FIG. 19.

According to exemplary embodiments of a mobility management method and apparatus in a communication system, mobility management procedures for one or more remote terminals connected to a base station through a relay terminal may be performed on a group basis. At least part of the mobility management procedures for the one or more remote terminals may be performed by the relay terminal rather than each of the one or more remote terminals. The relay terminal may transmit a separately configured virtual area identifier to the remote terminal instead of an area identifier (e.g., tracking area identifier (TAI) or radio access network (RAN) area identifier (RAI)) received from the base station. Accordingly, an update procedure for a TA or RNA can be performed by the relay terminal rather than the one or more remote terminals. According to the mobility management method, the amount of load generated in the network for mobility management can be reduced.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a relay terminal, comprising:
   receiving, from a first base station to which the relay terminal is connected, a first area identifier for a first area corresponding to the first base station;
   generating a first virtual area identifier distinct from the first area identifier;
   transmitting the first virtual area identifier to a first remote terminal connected to the first base station through relaying of the relay terminal;
   performing a first area update procedure triggered by the first remote terminal based on the first virtual area identifier; and
   storing a first temporary identifier obtained based on the first area update procedure,
   wherein the first temporary identifier is used for a paging procedure for the first remote terminal.

2. The operation method according to claim 1, wherein the performing of the first area update procedure comprises:
   receiving, from the first remote terminal, a first request message for the first area update procedure;
   transmitting, to the first base station, a second request message based on the received first request message;
   receiving, from the first base station, a first response message as a response to the second request message;
   transmitting, to the first remote terminal, a second response message based on the first response message; and
   receiving, from the first remote terminal, the first temporary identifier obtained by the first remote terminal based on the second response message.

3. The operation method according to claim 2, wherein the second request message includes a plurality of temporary identifiers respectively preconfigured for a plurality of remote terminals connected to the first base station through relaying of the relay terminal, and the plurality of remote terminals include the first remote terminal.

4. The operation method according to claim 1, further comprising:
   moving to a second base station belonging to a second area different from the first area, after storing the first temporary identifier;
   receiving, from the second base station, a second area identifier for the second area;
   transmitting, to the first remote terminal, the first virtual area identifier;
   performing a second area update procedure triggered by the relay terminal based on the received second area identifier; and
   storing a second temporary identifier obtained by the relay terminal based on the second area update procedure,
   wherein the second temporary identifier is an identifier newly assigned for the paging procedure for the first remote terminal.

5. The operation method according to claim 4, wherein the performing of the second area update procedure comprises:
   determining whether the second area update procedure is required based on the second area identifier;
   generating a second request message when the second area update procedure is determined to be required;
   transmitting the generated second request message to the first base station;
   receiving, from the first base station, a first response message as a response to the second request message; and
   obtaining the second temporary identifier included in the first response message.

6. The operation method according to claim 1, further comprising:
   performing a third area update procedure triggered by the first remote terminal based on a first cycle timer, after storing the first temporary identifier; and
   storing a third temporary identifier received from the first remote terminal based on the third area update procedure,
   wherein the third temporary identifier is an identifier newly assigned for the paging procedure for the first remote terminal.

7. The operation method according to claim 1, further comprising: after storing the first temporary identifier, deleting the stored first temporary identifier based on a second cycle timer.

8. The operation method according to claim 1, further comprising:
   receiving a radio resource control (RRC) release message for a second remote terminal in an RRC-connected state, which is connected the first base station through relaying of the relay terminal;
   transmitting the received RRC release message to the second remote terminal;

receiving, from the second remote terminal, a fourth temporary identifier obtained by the second remote terminal based on the RRC release message; and storing the fourth temporary identifier, wherein the fourth temporary identifier is used for the paging procedure for the second remote terminal.

9. The operation method according to claim 1, wherein each of the first and second areas is a tracking area (TA), each of the first and second area identifiers is a TA identifier (TAI), the first virtual area identifier is a virtual-TAI (V-TAI), and each of the first and second area update procedures is a TA update (TAU) procedure.

10. The operation method according to claim 1, wherein each of the first and second areas is a radio access network (RAN) notification area (RNA), each of the first and second area identifiers is a RAN area identifier (RAI), the first virtual area identifier is a virtual-RAI (V-RAI), and each of the first and second area update procedures is an RNA update (RNAU) procedure.

11. An operation method of a first base station, comprising:

transmitting, to a first relay terminal connected to the first base station, a first area identifier for a first area corresponding to the first base station; and transmitting a first temporary identifier to the first relay terminal based on a first area update procedure triggered by a first remote terminal connected to the first base station through relaying of the first relay terminal, wherein the first area update procedure is triggered by the first remote terminal when the first remote terminal receives a first virtual area identifier distinct from the first area identifier, which is generated by the first relay terminal, and the first temporary identifier is used for a paging procedure for the first remote terminal.

12. The operation method according to claim 11, wherein the transmitting of the first temporary identifier comprises:

receiving a second request message transmitted by the first relay terminal based on a first request message for the first area update procedure, the first request message being received by the first relay terminal from the first remote terminal; and transmitting a first response message including the first temporary identifier in response to the second request message.

13. The operation method according to claim 12, wherein the second request message includes a plurality of temporary identifiers respectively preconfigured for a plurality of remote terminals connected to the first base station through relaying of the first relay terminal, and the plurality of remote terminals include the first remote terminal.

14. The operation method according to claim 12, wherein each of the first and second areas is a tracking area (TA), each of the first and second area identifiers is a TA identifier (TAI), the first virtual area identifier is a virtual-TAI (V-TAI), each of the first and second area update procedures is a TA update (TAU) procedure, and the transmitting of the first response message comprises:

transmitting, to a core network to which the first base station is connected, a third request message based on the second request message;

receiving, from the core network, a second response message including the first temporary identifier configured for the first remote terminal as a response to the third request message; and transmitting, to the first remote terminal, the first response message including the first temporary identifier included in the second response message.

15. The operation method according to claim 12, wherein each of the first and second areas is a radio access network (RAN) notification area (RNA), each of the first and second area identifiers is a RAN area identifier (RAI), the first virtual area identifier is a virtual-RAI (V-RAI), each of the first and second area update procedures is an RNA update (RNAU) procedure, and the transmitting of the first response message comprises:

configuring the first temporary identifier for the first remote terminal based on the second request message; and transmitting, to the first remote terminal, the first response message including the first temporary identifier configured for the first remote terminal.

16. The operation method according to claim 11, further comprising: after transmitting the first temporary identifier, transmitting a second temporary identifier to the first relay terminal based on a second area update procedure triggered by the first remote terminal based on a first cycle timer, wherein the second temporary identifier is an identifier newly assigned for the paging procedure for the first remote terminal.

17. A relay terminal comprising a processor, wherein the processor causes the relay terminal to perform:

receiving, from a first base station to which the relay terminal is connected, a first area identifier for a first area corresponding to the first base station;

generating a first virtual area identifier distinct from the first area identifier;

transmitting the first virtual area identifier to a first remote terminal connected to the first base station through relaying of the relay terminal;

performing a first area update procedure triggered by the first remote terminal based on the first virtual area identifier; and storing a first temporary identifier obtained based on the first area update procedure, wherein the first temporary identifier is used for a paging procedure for the first remote terminal.

18. The relay terminal according to claim 17, wherein in the performing of the first area update procedure, the processor further causes the relay terminal to perform:

receiving, from the first remote terminal, a first request message for the first area update procedure;

transmitting, to the first base station, a second request message based on the received first request message;

receiving, from the first base station, a first response message as a response to the second request message;

transmitting, to the first remote terminal, a second response message based on the first response message; and receiving, from the first remote terminal, the first temporary identifier obtained by the first remote terminal based on the second response message.

19. The relay terminal according to claim 17, wherein the processor further causes the relay terminal to perform:

moving to a second base station belonging to a second area different from the first area, after storing the first temporary identifier;

receiving, from the second base station, a second area identifier for the second area;

transmitting, to the first remote terminal, the first virtual area identifier;

performing a second area update procedure triggered by the relay terminal based on the received second area identifier; and storing a second temporary identifier obtained by the relay terminal based on the second area update procedure, wherein the second temporary identifier is an identifier newly assigned for the paging procedure for the first remote terminal.

20. The relay terminal according to claim 17, wherein the processor further causes the relay terminal to perform:

performing a third area update procedure triggered by the first remote terminal based on a first cycle timer, after storing the first temporary identifier; and storing a third temporary identifier received from the first remote terminal based on the third area update procedure, wherein the third temporary identifier is an identifier newly assigned for the paging procedure for the first remote terminal.

* * * * *